United States Patent
Wilson et al.

(10) Patent No.: US 11,137,144 B2
(45) Date of Patent: Oct. 5, 2021

(54) AXIAL FUEL STAGING SYSTEM FOR GAS TURBINE COMBUSTORS

(71) Applicant: General Electric Company, Schenectady, NY (US)

(72) Inventors: Matthew Bernard Wilson, Greer, SC (US); James Harper, Greenville, SC (US); Yon Han Chong, Greer, SC (US); Charlie Edmond Jones, Greenville, SC (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 15/838,149

(22) Filed: Dec. 11, 2017

(65) Prior Publication Data

US 2019/0178498 A1    Jun. 13, 2019

(51) Int. Cl.
*F23R 3/34* (2006.01)
*F23R 3/28* (2006.01)
(Continued)

(52) U.S. Cl.
CPC ............. *F23R 3/346* (2013.01); *F02C 7/228* (2013.01); *F23R 3/045* (2013.01); *F23R 3/286* (2013.01);
(Continued)

(58) Field of Classification Search
CPC .. F23R 3/34; F23R 3/346; F23R 3/283; F23R 3/045; F23R 3/06; F23R 3/60;
(Continued)

(56) References Cited

U.S. PATENT DOCUMENTS 2,926,495 A    3/1960  Benson et al.
3,303,645 A    2/1967  Ishibashi
(Continued)

FOREIGN PATENT DOCUMENTS

EP    3217097 B1    11/2015
EP    2829707 B1    8/2016
(Continued)

OTHER PUBLICATIONS

Extended European Search Report for corresponding EP application No. 18210148.5, dated Feb. 18, 2019.

*Primary Examiner* — Alain Chau
(74) *Attorney, Agent, or Firm* — Fletcher Yoder, P.C.

(57) ABSTRACT

A gas turbine combustor includes: a head end comprising a primary fuel nozzle; a liner defining a primary combustion zone proximate the head end and a downstream secondary combustion zone; a forward casing radially outward of and surrounding at least a portion of the liner; and an axial fuel staging system. The axial fuel staging system includes a plurality of fuel injection assemblies. Each fuel injection assembly includes a thimble assembly mounted to the liner, and an injector unit attached to the forward casing. A thimble of the thimble assembly extends through a thimble aperture in the liner. The injector unit extends through the forward casing, such that a portion of the injector unit is disposed within the thimble, and a fuel line fitting is disposed outward of the forward casing. The injector unit introduces fuel into air flowing through the thimble for injection into the secondary combustion zone.

21 Claims, 15 Drawing Sheets

(51) Int. Cl.
*F23R 3/04* (2006.01)
*F02C 7/228* (2006.01)
*F23R 3/00* (2006.01)

(52) U.S. Cl.
CPC ..... *F23R 3/002* (2013.01); *F23R 2900/03341* (2013.01)

(58) Field of Classification Search
CPC .. F23R 2900/03341; F23R 3/286; F23R 3/04; F02C 7/222; F02C 7/228; F23C 6/045; F23C 6/047; F23D 17/00; F23D 23/00
See application file for complete search history.

(56) References Cited

U.S. PATENT DOCUMENTS

| | | | |
|---|---|---|---|
| 3,304,713 A | 2/1967 | Szydlowski | |
| 3,381,471 A | 5/1968 | Szydlowski | |
| 3,934,409 A * | 1/1976 | Quillevere | F23R 3/34 60/749 |
| 3,958,416 A | 5/1976 | Hammond, Jr. et al. | |
| 4,112,676 A | 9/1978 | DeCorso | |
| 4,926,630 A | 5/1990 | Shekleton | |
| 5,235,805 A | 8/1993 | Barbier et al. | |
| 5,749,219 A | 5/1998 | DuBell | |
| 5,845,480 A * | 12/1998 | DeFreitas | F02P 23/045 60/776 |
| 6,047,550 A | 4/2000 | Beebe | |
| 6,868,676 B1 | 3/2005 | Haynes | |
| 7,886,545 B2 | 2/2011 | Lacy et al. | |
| 7,891,194 B2 | 2/2011 | Biebel et al. | |
| 8,112,216 B2 | 2/2012 | Davis, Jr. et al. | |
| 8,275,533 B2 | 9/2012 | Davis, Jr. et al. | |
| 8,375,726 B2 | 2/2013 | Wiebe et al. | |
| 8,407,892 B2 | 4/2013 | DiCintio et al. | |
| 8,457,861 B2 | 6/2013 | Davis, Jr. et al. | |
| 8,656,721 B2 * | 2/2014 | Matsumoto | F23R 3/346 60/733 |
| 8,677,753 B2 | 3/2014 | Melton et al. | |
| 8,689,559 B2 | 4/2014 | Kraemer et al. | |
| 8,707,707 B2 | 4/2014 | Venkataraman et al. | |
| 8,745,987 B2 | 6/2014 | Stoia et al. | |
| 8,752,386 B2 | 6/2014 | Fox et al. | |
| 8,769,955 B2 | 7/2014 | Van Nieuwenhuizen et al. | |
| 8,904,796 B2 | 12/2014 | Singh | |
| 8,919,137 B2 | 12/2014 | DiCintio et al. | |
| 8,991,192 B2 | 3/2015 | Wiebe et al. | |
| 9,010,120 B2 | 4/2015 | DiCintio et al. | |
| 9,010,123 B2 | 4/2015 | Rudrapatna et al. | |
| 9,016,066 B2 | 4/2015 | Wiebe et al. | |
| 9,038,395 B2 | 5/2015 | Rudrapatna et al. | |
| 9,097,424 B2 | 8/2015 | Chen et al. | |
| 9,133,722 B2 | 9/2015 | LeBegue et al. | |
| 9,151,500 B2 | 10/2015 | Chen et al. | |
| 9,170,024 B2 * | 10/2015 | Stoia | F23R 3/54 |
| 9,200,808 B2 * | 12/2015 | Romig | F23R 3/36 |
| 9,222,673 B2 | 12/2015 | Boardman et al. | |
| 9,228,499 B2 | 1/2016 | Stryapunin | |
| 9,291,098 B2 | 3/2016 | Chen et al. | |
| 9,303,872 B2 | 4/2016 | Hadley et al. | |
| 9,366,443 B2 | 6/2016 | Laster et al. | |
| 9,376,961 B2 | 6/2016 | Stoia et al. | |
| 9,388,987 B2 | 7/2016 | Valeev et al. | |
| 9,400,113 B2 | 7/2016 | Ogata et al. | |
| 9,534,790 B2 | 1/2017 | Cai et al. | |
| 9,551,490 B2 | 1/2017 | DiCintio et al. | |
| 9,551,491 B2 | 1/2017 | Eroglu et al. | |
| 9,567,910 B2 | 2/2017 | Fuller | |
| 9,938,903 B2 * | 4/2018 | Hughes | F23R 3/002 |
| 10,094,566 B2 | 10/2018 | Borchert et al. | |
| 10,228,141 B2 | 3/2019 | Cihlar et al. | |
| 10,436,450 B2 * | 10/2019 | Crawley | F23R 3/286 |
| 10,480,792 B2 * | 11/2019 | Slobodyanskiy | F23N 1/022 |
| 10,513,987 B2 * | 12/2019 | Hughes | F23R 3/34 |
| 10,590,850 B2 | 3/2020 | Ogata et al. | |
| 10,739,005 B2 | 8/2020 | Kironn et al. | |
| 10,865,992 B2 * | 12/2020 | DiCintio | F23D 14/64 |
| 2002/0189260 A1 | 12/2002 | David et al. | |
| 2010/0170254 A1 * | 7/2010 | Venkataraman | F23R 3/346 60/746 |
| 2010/0229557 A1 * | 9/2010 | Matsumoto | F23R 3/34 60/737 |
| 2010/0242482 A1 * | 9/2010 | Kraemer | F02C 7/228 60/746 |
| 2012/0102958 A1 * | 5/2012 | Stoia | F02C 7/22 60/740 |
| 2013/0098044 A1 * | 4/2013 | Singh | F23R 3/045 60/742 |
| 2013/0104553 A1 | 5/2013 | Stoia et al. | |
| 2013/0174569 A1 * | 7/2013 | Stoia | F23R 3/54 60/776 |
| 2013/0239575 A1 * | 9/2013 | Chen | F23R 3/04 60/747 |
| 2013/0283801 A1 * | 10/2013 | Romig | F23R 3/28 60/733 |
| 2014/0260264 A1 * | 9/2014 | Stoia | F02C 6/08 60/734 |
| 2014/0260272 A1 * | 9/2014 | DiCintio | F01D 9/023 60/739 |
| 2014/0338359 A1 * | 11/2014 | Valeev | F23L 7/00 60/776 |
| 2015/0027126 A1 * | 1/2015 | Berry | F02C 7/222 60/739 |
| 2015/0107255 A1 * | 4/2015 | Stewart | F23R 3/346 60/733 |
| 2015/0159877 A1 | 6/2015 | Stoia et al. | |
| 2016/0258629 A1 * | 9/2016 | Slobodyanskiy | F23R 3/286 |
| 2016/0265781 A1 | 9/2016 | Carnell, Jr. et al. | |
| 2016/0265782 A1 | 9/2016 | Bhagat et al. | |
| 2017/0175636 A1 * | 6/2017 | Hughes | F23R 3/002 |
| 2017/0219212 A1 | 8/2017 | Laster et al. | |
| 2017/0254540 A1 | 9/2017 | DiCintio et al. | |
| 2017/0268784 A1 * | 9/2017 | Crawley | F23R 3/286 |
| 2017/0268786 A1 * | 9/2017 | Cai | F02C 7/222 |
| 2018/0187607 A1 * | 7/2018 | Hughes | F23R 3/346 |
| 2018/0187893 A1 * | 7/2018 | DiCintio | F23R 3/346 |
| 2018/0187894 A1 * | 7/2018 | Cai | F23R 3/286 |

FOREIGN PATENT DOCUMENTS

| | | |
|---|---|---|
| EP | 2236938 B1 | 10/2016 |
| EP | 2902708 B1 | 2/2017 |
| EP | 3214372 A1 | 2/2017 |
| EP | 3214374 B1 | 2/2017 |
| GB | 791617 A * 3/1958 | ............... F23R 3/34 |
| WO | 2015023863 A1 | 2/2015 |
| WO | 2017018982 A1 | 2/2017 |

* cited by examiner

AXIAL FUEL STAGING SYSTEM FOR GAS TURBINE COMBUSTORS

TECHNICAL FIELD

The present disclosure relates generally to gas turbine combustors used in gas turbines for electrical power generation and, more particularly, to an axial fuel staging (AFS) system associated with such combustors.

BACKGROUND

At least some known gas turbine assemblies are used for electrical power generation. Such gas turbine assemblies include a compressor, a combustor, and a turbine. Gas (e.g., ambient air) flows through the compressor, where the gas is compressed before delivery to one or more combustors. In each combustor, the compressed air is combined with fuel and ignited to generate combustion gases. The combustion gases are channeled from each combustor to and through the turbine, thereby driving the turbine, which, in turn, powers an electrical generator coupled to the turbine. The turbine may also drive the compressor by means of a common shaft or rotor.

In some combustors, the generation of combustion gases occurs at two, axially spaced stages to reduce emissions and/or to provide the ability to operate the gas turbine at reduced loads (commonly referred to as "turndown"). Such combustors are referred to herein as including an "axial fuel staging" (AFS) system, which delivers fuel and an oxidant to one or more fuel injectors downstream of the head end of the combustor. In a combustor with an AFS system, one or more primary fuel nozzles at an upstream end of the combustor inject fuel and air (or a fuel/air mixture) in an axial direction into a primary combustion zone, and one or more AFS fuel injectors located at a position downstream of the primary fuel nozzle(s) inject fuel and air (or a second fuel/air mixture) through the liner as a cross-flow into a secondary combustion zone downstream of the primary combustion zone. The cross-flow is generally transverse to the flow of combustion products from the primary combustion zone.

In some cases, the fuel supply to the AFS injectors has been conveyed through fuel lines attached to the combustor liner and located within the combustor casing. Such configurations may result in assembly challenges and in difficulty detecting leaks. Additionally, because of the potential for leaks within the combustor casing, the use of highly reactive fuels has been limited or restricted in existing combustors with AFS injectors, due to the risk that the leaked highly reactive fuel may combust within the high-pressure, high-temperature environment of the combustor casing.

SUMMARY

According to a first aspect provided herein, a combustor for a power-generating gas turbine includes: a head end comprising a primary fuel nozzle; a liner coupled to the head end and defining a primary combustion zone proximate the head end and a secondary combustion zone downstream of the primary combustion zone; a forward casing radially outward of and surrounding at least a portion of the liner; and an axial fuel staging system. The axial fuel staging system includes a first fuel injection assembly, which includes: a first thimble assembly and a first injector unit. The first thimble assembly is mounted to the liner and including a first thimble extending through a first thimble aperture in the liner. The first injector unit is attached to the forward casing and extends through the forward casing, such that a portion of the first injector unit is disposed within the first thimble, and a main fuel inlet is disposed outward of the forward casing. The first fuel injection assembly introduces a flow of fuel into a flow of air flowing through the first thimble, such that fuel and air are injected into the secondary combustion zone in a direction transverse to a flow of combustion products from the primary combustion zone.

According to a second aspect provided herein, a combustor for a power-generating gas turbine includes: a head end comprising a primary fuel nozzle; a liner coupled to the head end and defining a primary combustion zone proximate the head end and a secondary combustion zone downstream of the primary combustion zone; a forward casing radially outward of and surrounding at least a portion of the liner; and an axial fuel staging system. The axial fuel staging system includes a plurality of fuel injection assemblies. Each fuel injection assembly includes a thimble assembly and an injector unit. The thimble unit is mounted to the liner and includes a thimble extending through a thimble aperture in the liner. The injector unit is attached to the forward casing and extends through the forward casing, such that a portion of the injector unit is disposed within the thimble, and a fuel line fitting of the injector unit is disposed outward of the forward casing. The injector unit introduces a flow of fuel into a flow of air flowing through the thimble, such that fuel and air are injected into the secondary combustion zone in a direction transverse to a flow of combustion products from the primary combustion zone.

According to another aspect of the present disclosure, an injection assembly for a gas turbine combustor having a liner defining a combustion zone and a secondary combustion zone and a forward casing circumferentially surrounding at least a portion of the liner is provided. The injection assembly includes a thimble assembly and an injector unit. The thimble assembly includes a thimble boss mounted to the liner and a thimble extending through the thimble boss and a thimble opening in the liner. The injector unit, which is mounted to and extends through the forward casing, includes an injector blade that extends into the thimble. The injection assembly introduces a flow of fuel into a flow of air flowing through the thimble, such that fuel and air are injected into the secondary combustion zone in a direction transverse to a flow of combustion products from the primary combustion zone.

According to yet another aspect of the present disclosure, an injection assembly for a gas turbine combustor having a liner defining a combustion zone and a secondary combustion zone and a forward casing circumferentially surrounding at least a portion of the liner is provided. The injection assembly includes a thimble assembly and an injector unit. The thimble assembly, which is mounted to the liner, includes a thimble that extends through a thimble opening in the liner. The injector unit, which is mounted to and extends through the forward casing, includes an injector blade that extends into the thimble. The injection assembly introduces a flow of fuel into a flow of air flowing through the thimble, such that fuel and air are injected into the secondary combustion zone in a direction transverse to a flow of combustion products from the primary combustion zone.

According to another aspect of the present disclosure, a thimble assembly for directing fluid flow through a combustor liner is provided. The thimble assembly includes a thimble boss and a thimble. The thimble boss is mounted an outer surface of the combustor liner and surrounding a thimble aperture in the combustor liner, thereby defining a passage through the thimble boss. The thimble is disposed through the passage and the thimble aperture in the combustor liner. The thimble includes a thimble wall extending from an inlet portion to an outlet opening of the thimble, the inlet portion having a greater diameter than the outlet opening. An inner surface of the thimble wall defines an arcuate shape from the inlet portion to the outlet opening, and the arcuate shape defines one-fourth of an ellipse.

According to a further aspect of present disclosure, a thimble assembly for directing fluid flow through a combustor liner is provided. The thimble assembly includes a thimble boss and a thimble. The thimble boss is mounted an outer surface of the combustor liner and surrounds an opening in the combustor liner, thus defining a passage through the thimble boss. The thimble is disposed through the passage and the opening in the combustor liner. The thimble includes a thimble wall extending from an inlet portion to an outlet of the thimble. The inlet portion, which has a greater diameter than the outlet, defines an inlet plane and an intermediate plane parallel to the inlet plane. The inlet portion also defines an elliptical shape having a center coincident with an injection axis of the thimble. A terminal plane, which is defined parallel to the intermediate plane, includes an array of points most distant from a corresponding array of points defining the intermediate plane. The thimble wall has a non-uniform length, such that the outlet of the thimble is oriented at an oblique angle relative to the terminal plane.

BRIEF DESCRIPTION OF THE DRAWINGS

The specification, directed to one of ordinary skill in the art, sets forth a full and enabling disclosure of the present products and methods, including the best mode of using the same. The specification refers to the appended figures, in which.

DETAILED DESCRIPTION

The following detailed description illustrates various axial fuel staging (AFS) fuel injection assemblies, their component parts, and AFS systems including the same, by way of example and not limitation. The description enables one of ordinary skill in the art to make and use the axial fuel staging system for gas turbine combustors. The description provides several embodiments of the fuel injection assemblies, including what are presently believed to be the best modes of making and using the fuel injection assemblies. The present axial fuel staging system is described herein as being coupled to a combustor of a heavy-duty gas turbine assembly. However, it is contemplated that the fuel injection assemblies and/or axial fuel staging system described herein have general application to a broad range of systems in a variety of fields other than electrical power generation.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The "forward" portion of a component is that portion nearest the combustor head end and/or the compressor, while the "aft" portion of a component is that portion nearest the exit of the combustor and/or the turbine section.

As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

Figure 1:
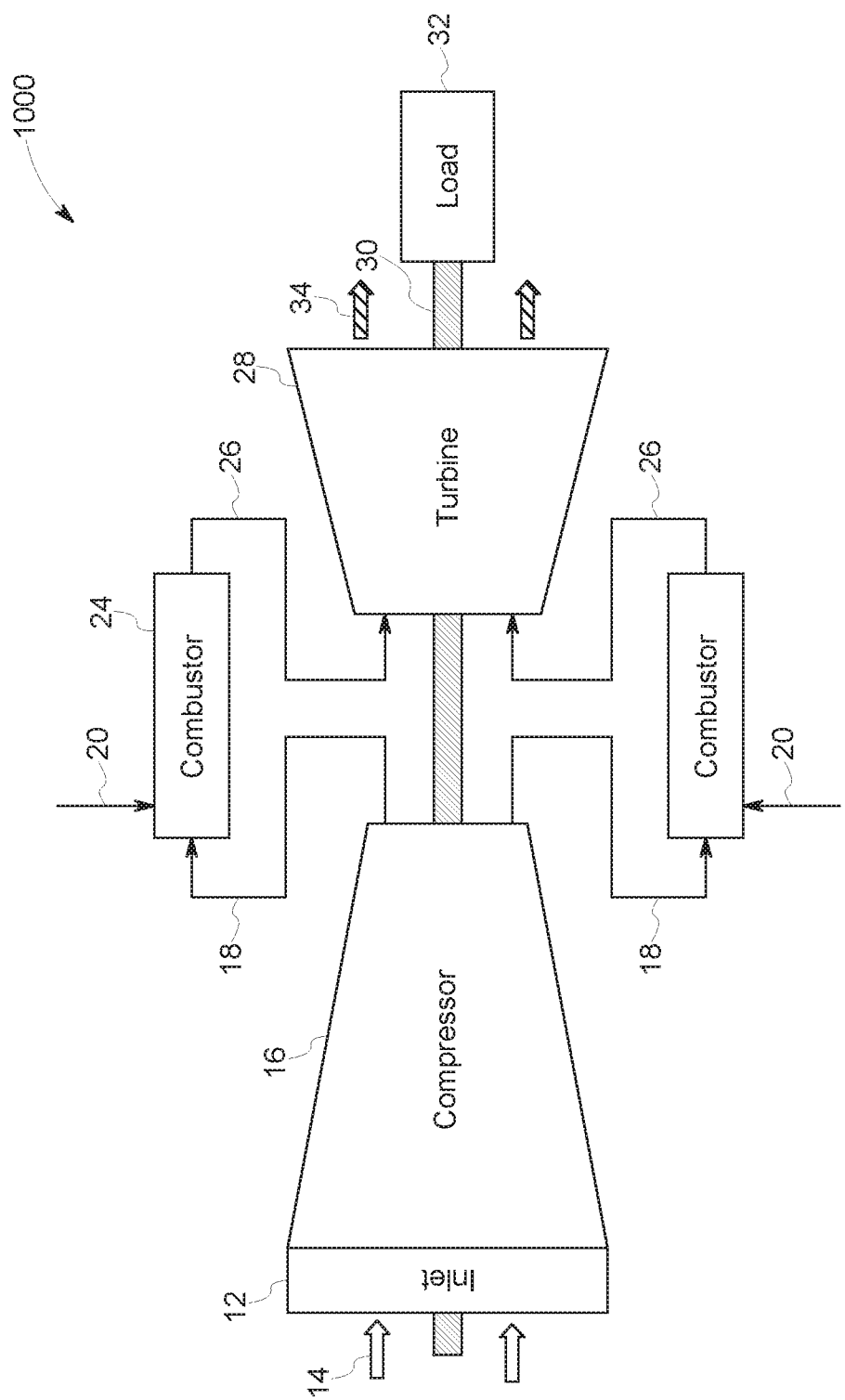
FIG. 1 is a schematic illustration of a power-generating gas turbine assembly, as may employ the present axial fuel staging system and its associated fuel injection assemblies, as described herein.

FIG. 1 provides a functional block diagram of an exemplary gas turbine 1000 that may incorporate various embodiments of the present disclosure. As shown, the gas turbine 1000 generally includes an inlet section 12 that may include a series of filters, cooling coils, moisture separators, and/or other devices to purify and otherwise condition a working fluid (e.g., air) 14 entering the gas turbine 1000. The working fluid 14 flows to a compressor section where a compressor 16 progressively imparts kinetic energy to the working fluid 14 to produce a compressed working fluid 18.

The compressed working fluid 18 is mixed with a gaseous fuel 20 from a gaseous fuel supply system and/or a liquid fuel (not shown separately) from a liquid fuel supply system to form a combustible mixture within one or more combustors 24. The combustible mixture is burned to produce combustion gases 26 having a high temperature, pressure, and velocity. The combustion gases 26 flow through a turbine 28 of a turbine section to produce mechanical work. For example, the compressor 16 and the turbine 28 include rotating blades connected to a plurality of rotor disks that together define a hollow shaft stacked rotor 30 so that rotation of the turbine 28 drives the compressor 16 to produce the compressed working fluid 18. Alternately or in addition, the stacked rotor 30 may connect the turbine 28 to a load 32, such as a generator for producing electricity.

Exhaust gases 34 from the turbine 28 flow through an exhaust section (not shown) that connects the turbine 28 to an exhaust stack downstream from the turbine 28. The exhaust section may include, for example, a heat recovery steam generator (not shown) for cleaning and extracting additional heat from the exhaust gases 34 prior to release to the environment. The gas turbine 1000 may be further coupled or fluidly connected to a steam turbine to provide a combined cycle power plant.

The combustors 24 may be any type of combustor known in the art, and the present invention is not limited to any particular combustor design unless specifically recited in the claims. For example, the combustor 24 may be a can type (sometimes called a can-annular type) of combustor.

Figure 2:
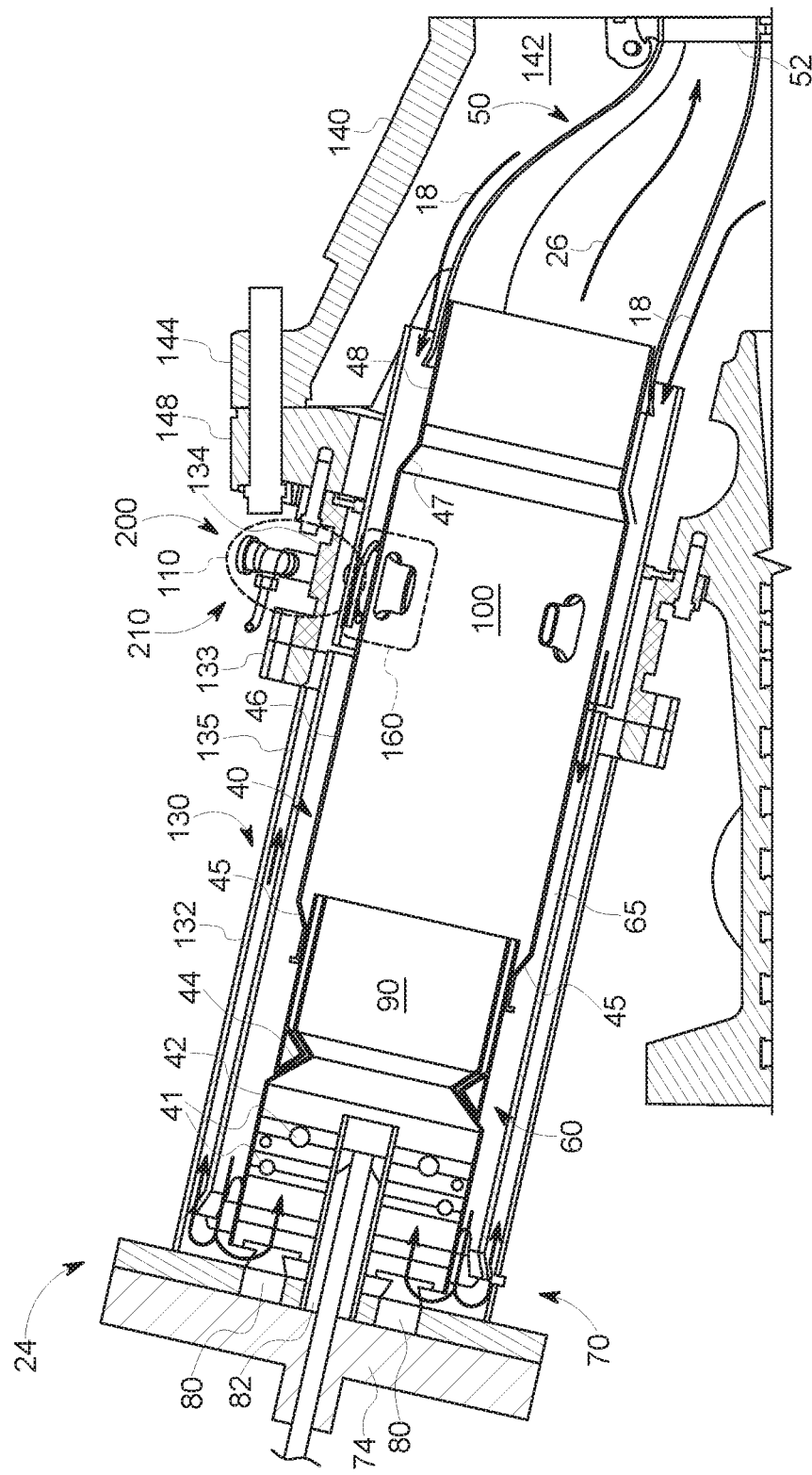
FIG. 2 is a cross-sectional side view of a combustion can, including the present axial fuel staging system, according to a first aspect provided herein.

FIG. 2 is a cross-sectional side view of the combustor, or combustion can, 24, as may be included in a can annular combustion system for a heavy-duty gas turbine (e.g., gas turbine 1000 shown in FIG. 1). In a can-annular combustion system, a plurality of combustion cans 24 (e.g., 8, 10, 12, 14, or more) are positioned in an annular array about the stacked rotor 30 that connects the compressor 16 to the turbine 28. The turbine 28 may be operably connected (e.g., by the shaft 30) to a generator 32 for producing electrical power.

In FIG. 2, the combustion can 24 includes a liner 40 and a transition piece 50 that contain and convey combustion gases 26 to the turbine 28. The liner 40 may have a first cylindrical liner section 42 including a venturi 44; a second cylindrical section 46 downstream of the venturi 44; and a third cylindrical section 48 downstream of the second cylindrical section 46. The first cylindrical liner section 42 has a first cross-sectional diameter, which is smaller than a second cross-sectional diameter of the second cylindrical liner section 46. A diverging section 45 is disposed between the first cylindrical liner section 42 and the second cylindrical liner section 46 to join the respective sections 42, 46 having different diameters. The third cylindrical liner section 48 has a third cross-sectional diameter, which is less than the second cross-sectional diameter of the second cylindrical liner section 46. A converging section 47 is disposed between the second cylindrical liner section 46 and the third cylindrical liner section 48 to join the respective sections 46, 48 having different diameters.

In one embodiment, the first cross-sectional diameter of the first cylindrical liner section 42 and the third cross-sectional diameter of the third cylindrical liner section 46 may be equal. In another embodiment, the first cross-sectional diameter and the third cross-sectional diameter may be different from one another, both the first cross-sectional diameter and the third-cross-sectional diameter being less than the second cross-sectional diameter.

The venturi 44 of the first cylindrical liner section 42 accelerates the flow of gases into a primary combustion zone 90. The second cylindrical liner section 46 slows the combustion gases down and provides sufficient residence time to reduce emissions of carbon monoxide and other volatile organic compounds (VOCs). The residence time of the combustion gases in the second cylindrical liner section 46 is longer than the residence time of the combustion gases in the first cylindrical liner section 42 and venturi 44.

As shown in FIG. 2, the first cylindrical liner section 42 and the venturi 44 may define an upstream segment of the liner 40, while the diverging section 45, the second cylindrical liner section 46, the converging section 47, and the third cylindrical liner section 48 may define a downstream segment of the liner 40 separate from the upstream segment. (The downstream segment is shown separately in FIG. 4.) In such instance, a seal (e.g., a hula seal, not shown) may be disposed between the upstream segment of the liner 40 and the downstream segment of the liner 40.

Figure 5:
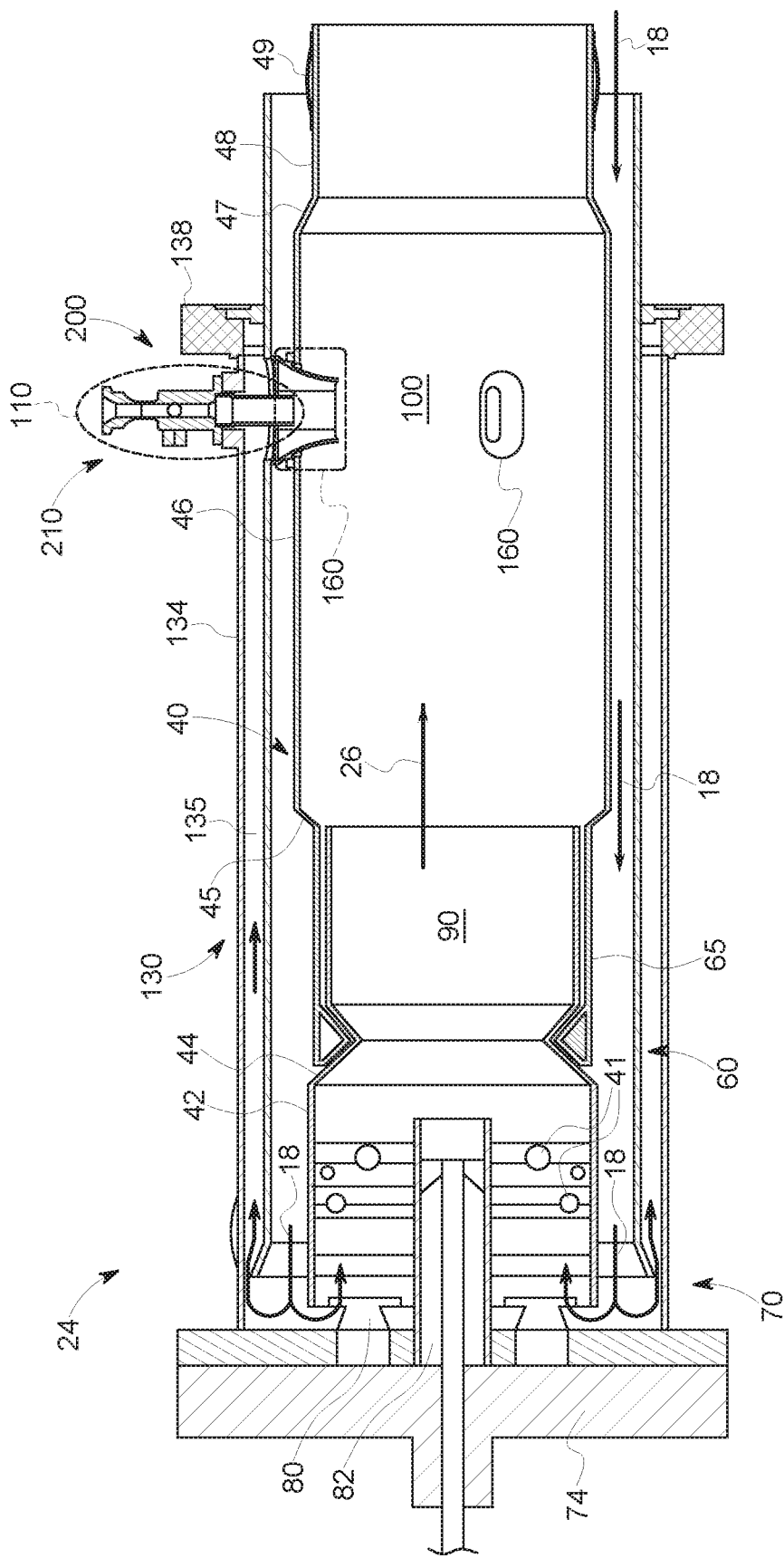
FIG. 5 is a cross-sectional side view of a portion of a combustion can, including the present fuel injection assemblies of the axial fuel staging system, according to a second aspect of the present disclosure.

Alternately, as shown in FIG. 5, the respective sections of the liner 40 are joined together as a single unit, thus eliminating the hula seal between the first cylindrical liner section 42 and the diverging section 45 of the second cylindrical liner section 46 and thereby preventing air leakages that might otherwise occur through the seal. As the other elements of FIG. 5 are described with reference to FIG. 2, their description need not be repeated here.

Figure 3:
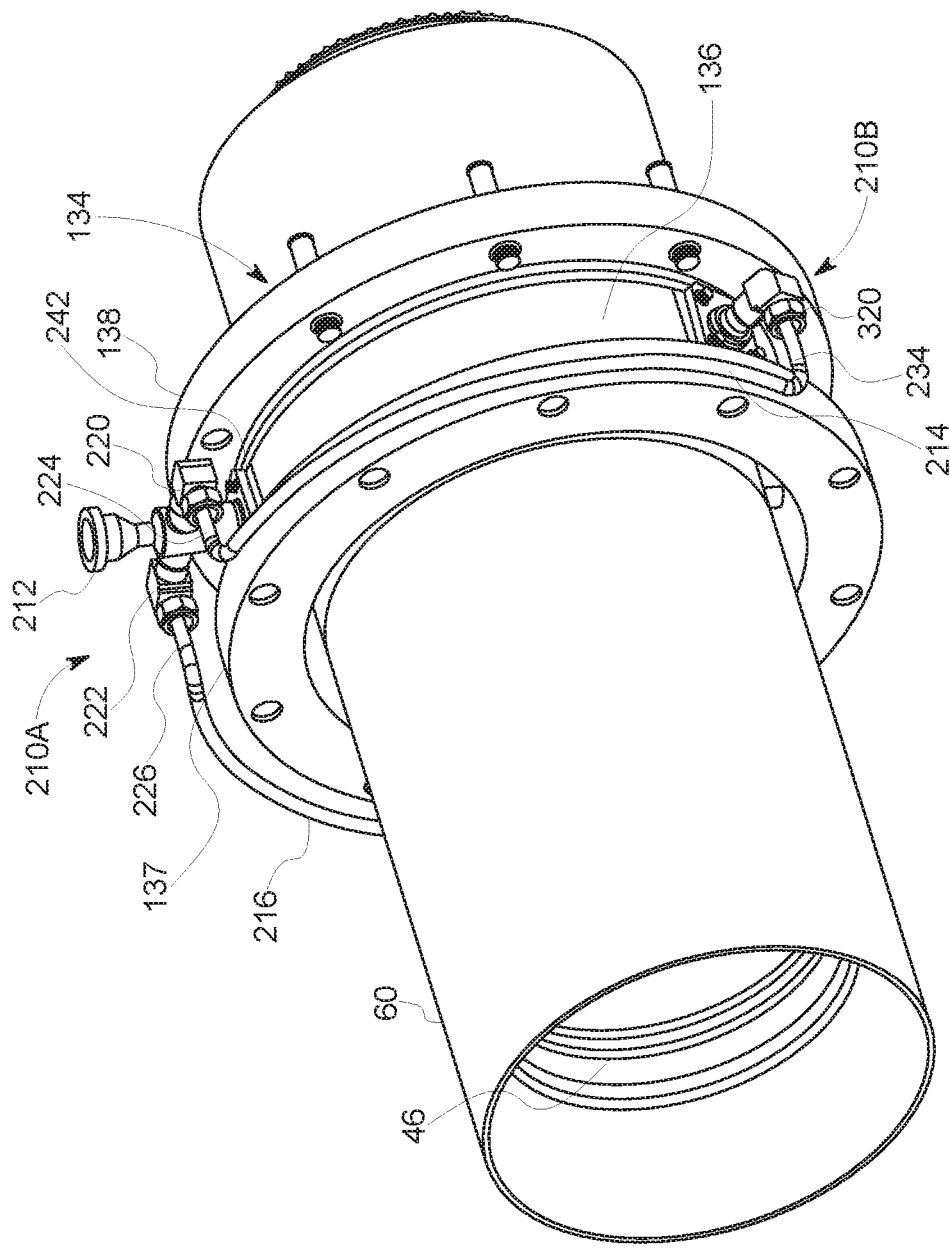
FIG. 3 is a perspective view of a portion of the combustion can of FIG. 2, including the present fuel injection assemblies of the axial fuel staging system.
Figure 4:
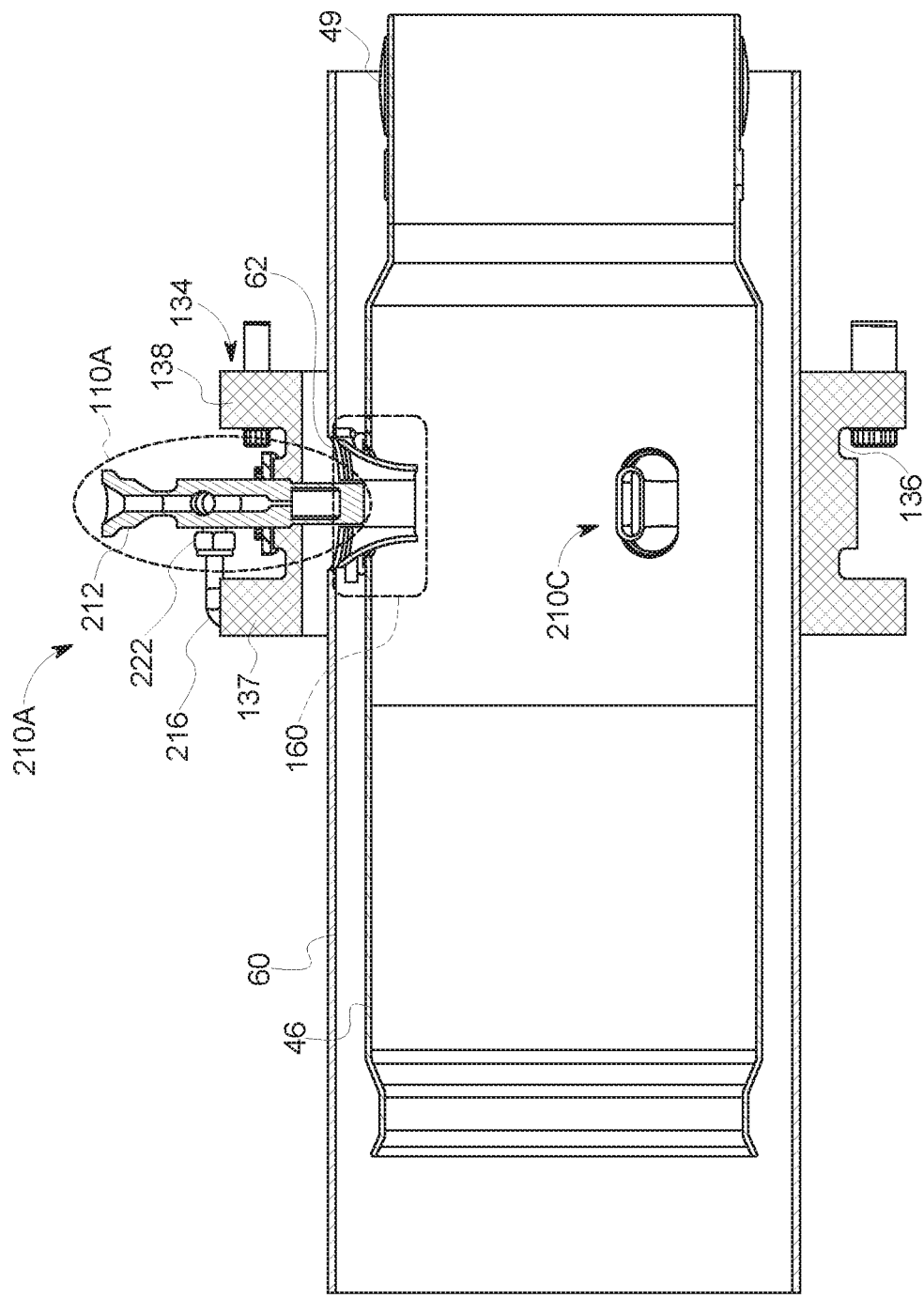
FIG. 4 is a cross-sectional side view of the combustion can of FIG. 3.

Whether the liner 40 includes multiple pieces (as shown in FIGS. 2-4) or is formed as an integrated unit (as in FIG. 5), the liner 40 forms a continuous flow path from the first cylindrical liner section 42 and the venturi 44; through the diverging section 45, the second cylindrical liner section 46, and the converging section 47; and through the third cylindrical liner section 48. The combustion products 26 are conveyed through the liner 40 and into a volume defined by the transition piece 50, which directs the combustion products 26 to the turbine 28. A seal (e.g., a hula seal 49, as shown in FIGS. 4 and 5) is positioned between the liner 40 and the transition piece 50.

Alternately, the liner 40 may have a unified body (or "unibody") construction, in which the cylindrical portion 48 is integrated with the transition piece 50. Thus, any discussion of the liner 40 herein is intended to encompass both conventional combustion systems having a separate liner and transition piece (as illustrated) and those combustion systems having a unibody liner, unless context dictates otherwise. Moreover, the present disclosure is equally applicable to those combustion systems in which the liner and the transition piece are separate components, but in which the transition piece and the stage one nozzle of the turbine are integrated into a single unit, sometimes referred to as a "transition nozzle" or an "integrated exit piece."

Referring to both FIGS. 2 and 5, an axial fuel staging (AFS) system 200 includes a number of fuel injection assemblies 210 disposed circumferentially around the second cylindrical portion 46 of the liner 40, as discussed further herein. The liner 40 is surrounded circumferentially by an outer sleeve 60, sometimes referred to as a flow sleeve, which extends axially along a significant portion of the liner 40. The outer sleeve 60 is spaced radially outward of the liner 40 to define an annulus 65 between the liner 40 and the outer sleeve 60. Air 18 flows through the annulus 65 from the aft end of the outer sleeve 60 toward a head end portion 70, thereby cooling the liner 40.

In some embodiments, a separate impingement sleeve (not shown) may be positioned radially outward of the transition piece 50 to cool the transition piece 50. If an impingement sleeve is used, the annulus defined between the transition piece 50 and the impingement sleeve is aligned with and fluidly connected to the annulus 65, thereby forming a continuous cooling air flow path along the entire axial length of the combustor can 24.

The head end portion 70 of the combustion can 24 includes one or more fuel nozzles 80, 82, and an end cover 74 at a forward end of the combustion can 24. Each fuel nozzle 80, 82 has a fuel inlet at an upstream (or inlet) end. The fuel inlets may be formed through the end cover 74, and the fuel nozzles 80, 82 themselves may be mounted to the end cover 74. The fuel nozzles 80, which may be described as primary fuel nozzles, are disposed radially outward of and surrounding a center fuel nozzle 82, which shares a centerline with a longitudinal axis of the combustor 24 and which extends axially downstream of the fuel nozzles 80. The aft (outlet) end of the center fuel nozzle 82 is proximate to the venturi 44 of the first cylindrical liner section 42. The aft ends of the primary fuel nozzles 80 may extend to or through openings in a cap assembly (not shown), which bounds a primary combustion zone 90.

In the premixed mode of operation, fuel and air are introduced by the fuel nozzles 80 into a volume defined by the first cylindrical liner section 42. Air flows through mixing holes 41 to promote mixing of the fuel and air, which are accelerated into the primary combustion zone 90 by the venturi 44. Likewise, fuel and air are introduced by the fuel nozzle 82 into the primary combustion zone 90 at or slightly downstream of the venturi 44, where the fuel and air are combusted to form combustion products.

The head end portion 70 of the combustion can 24 is at least partially surrounded by a forward casing 130 that is disposed radially outward of the outer sleeve 60, such that an annulus 135 is defined between the outer sleeve 60 and the forward casing 130. The forward casing 130 may have an upstream casing portion 132 and a downstream casing portion 134, which is mechanically coupled to a compressor discharge case (CDC) flange 144 of a compressor discharge case 140. In some embodiments, as shown in FIG. 2, a joining flange 148 may be disposed between the forward casing 130 and the CDC flange 144 of the compressor discharge case 140.

The downstream casing portion 134 may be a separate component that is bolted to a joining flange 133 of the upstream casing portion 132 and to the CDC flange 144 of the compressor discharge case 140 (e.g., via the joining flange 148), as shown in FIG. 2. Alternately, the downstream casing portion 134 may be integrally formed with the upstream casing portion 132 as a unitary forward casing 130, as shown in FIG. 5.

In cases where it is desirable to retrofit existing combustors 24 with the present axial fuel staging system 200, it may be cost-effective and expedient to leverage the existing forward casing 130 as the upstream casing portion 132 and to extend the length of the forward casing 130 through the addition of a separate downstream casing portion 134, which is bolted between the upstream casing portion 132 and the compressor discharge case 140.

The compressor discharge case 140 (shown in FIG. 2) is fluidly connected to an outlet of the compressor 16 (shown in FIG. 1) and defines a pressurized air plenum 142 that surrounds at least a portion of the combustion can 24. Air 18 flows from the compressor discharge case 140 through the aft end of the outer sleeve 60 and into the annulus 65, as indicated by the arrows in FIGS. 2 and 5, thereby cooling the liner 40.

Referring to both combustor cans 24 shown in FIGS. 2 and 5, because the annulus 65 is fluidly coupled to the head end portion 70, the air flow 18 travels upstream from the aft end of the outer sleeve 60 to the head end portion 70, where a first portion of the air flow 18 is directed radially inward and changes direction to enter the fuel nozzles 80, 82. A second portion of the air 18 flowing through the annulus 65 is directed radially outward into the annulus 135 defined between the outer sleeve 60 and the forward casing 130 and changes direction to enter the axial fuel staging system 200, as will be described further below. A third, relatively small portion of the air 18 is directed through the mixing holes 41, as discussed above.

As described above, the fuel nozzles 80, 82 introduce fuel and air into a primary combustion zone 90 at a forward end of the liner 40, where the fuel and air are combusted. In one embodiment, the fuel and air are mixed within the fuel nozzles 80, 82 (e.g., in a premixed fuel nozzle). In other embodiments, the fuel and air may be separately introduced into the primary combustion zone 90 and mixed within the primary combustion zone 90 (e.g., as may occur with a diffusion nozzle). Alternately, the fuel nozzles 80 and/or 82 may be configured to operate in a diffusion mode and a premixed mode, depending on the operating condition of the combustor 24. Reference made herein to a "first fuel/air mixture" should be interpreted as describing both a premixed fuel/air mixture and a diffusion-type fuel/air mixture, either of which may be produced by fuel nozzles 80, 82. The present disclosure is not limited to a particular type or arrangement of fuel nozzles 80, 82 in the head end portion 70. Further, it is not required that the center fuel nozzle 82 extend axially downstream of the primary fuel nozzles 80.

The combustion gases from the primary combustion zone 90 travel downstream through the liner 40 and the transition piece 50 toward an aft end 52 of the combustion can 24. As shown in FIG. 2, the aft end 52 of the combustion can 24 is represented by an aft frame of the transition piece 50 that connects to the turbine section 28. The transition piece 50 is a tapered section that accelerates the flow of combustion products from the liner 40, as the combustion products 26 enter the turbine section 28.

The axial fuel staging injection system 200 includes one or more fuel injection assemblies 210 (discussed in detail below) that introduce fuel and air into a secondary combustion zone 100, where the fuel and air are ignited by the primary zone combustion gases to form a combined combustion gas product stream 26. Such a combustion system having axially separated combustion zones is described as having an "axial fuel staging" (AFS) system 200, and the downstream injection assemblies 210 may be referred to herein as "injection assemblies," "fuel injection assemblies," or "AFS injection assemblies." Each fuel injection assembly 210 includes an injector unit 110 (mounted to the forward casing 130) and a thimble assembly 160 (mounted to the liner), which are mechanically independent from one another but which function as a single unit. The injector unit 110 delivers fuel into the thimble assembly 160, where the fuel mixes with air.

The forward casing 130 (specifically, the downstream portion 136 of the forward casing 130) includes at least one injector port 290 (shown in FIG. 11) through which a respective injector unit 110 of an AFS injection assembly 210 is installed. The outer sleeve 60 includes at least one injector opening 62 (shown most clearly in FIGS. 8 and 9), which is axially and circumferentially aligned with the injector port 290 and through which the respective injector unit 110 of the AFS injection assembly 210 is positioned.

Figure 8:
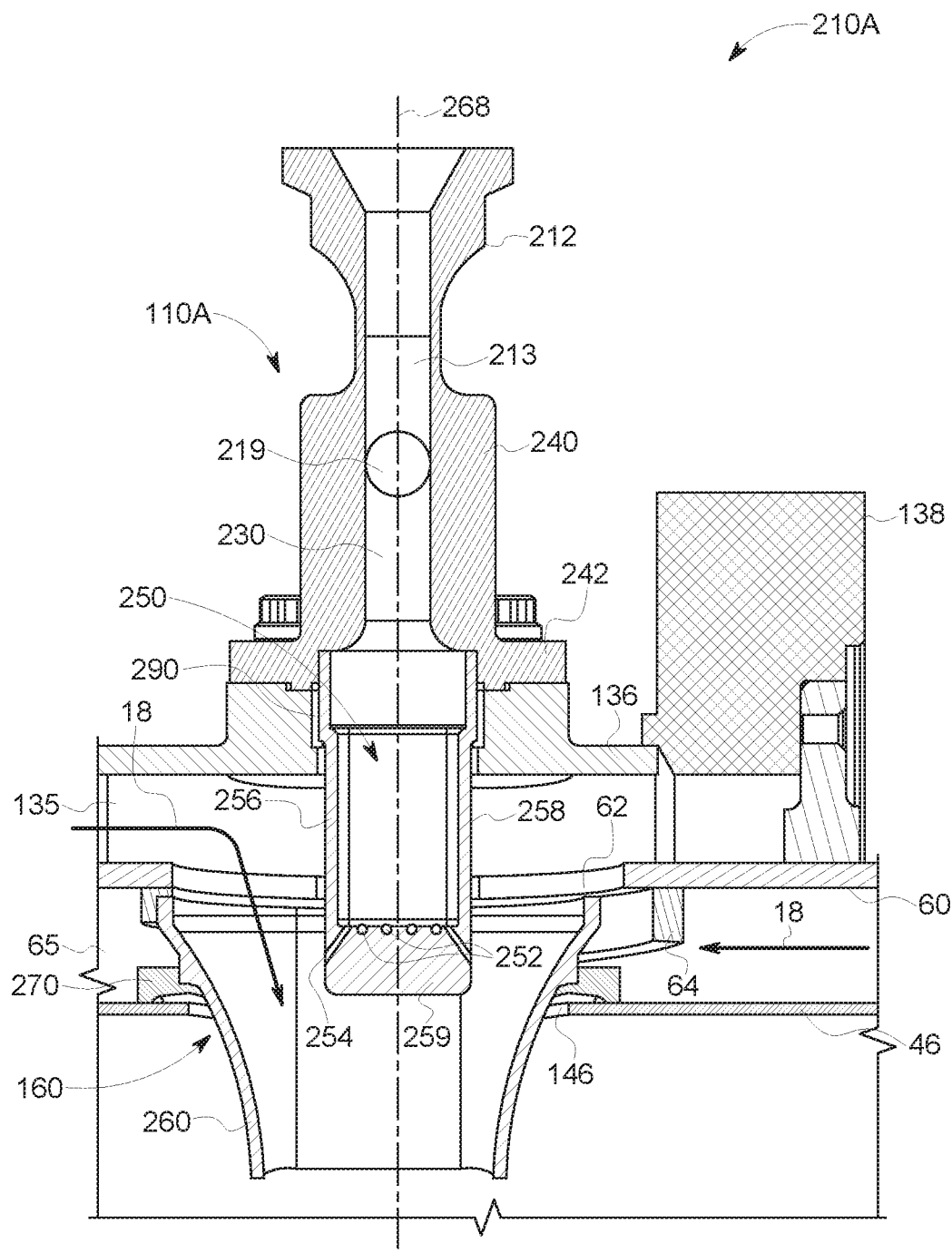
FIG. 8 is a cross-sectional side view of one of the fuel injection assemblies of the present axial fuel staging system.
Figure 9:
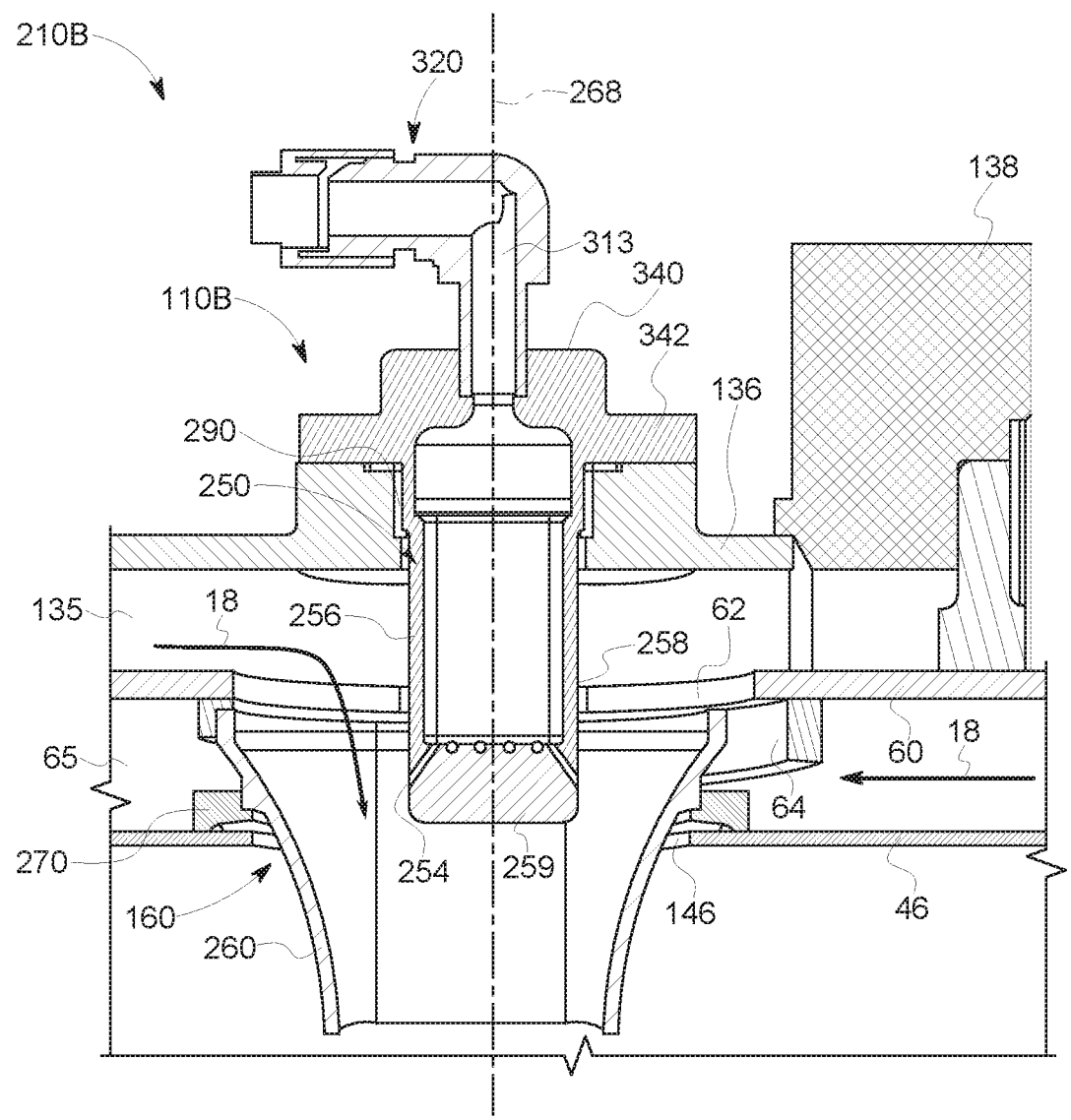
FIG. 9 is a cross-sectional side view of another of the fuel injection assemblies of the present axial fuel staging system.
Figure 11:
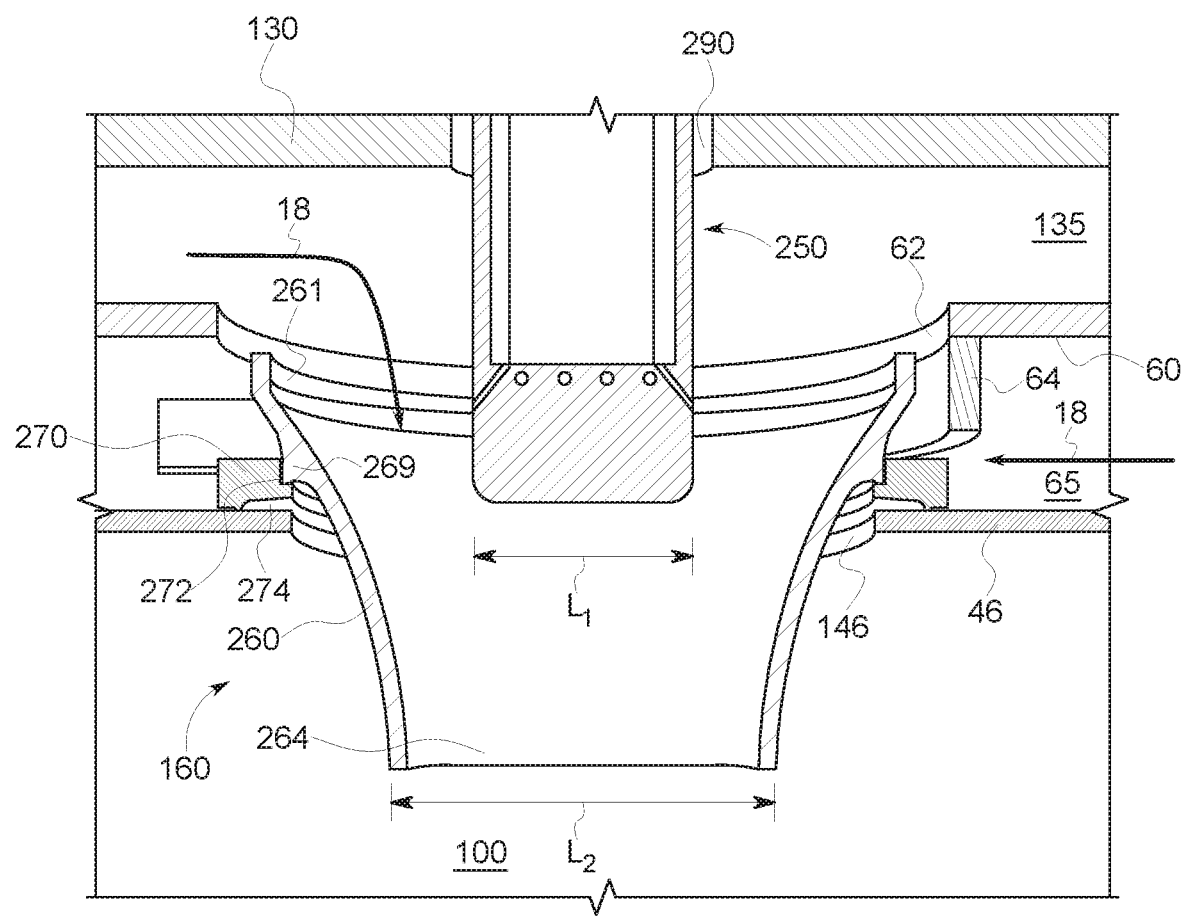
FIG. 11 is an enlarged cross-sectional side view of a portion of FIG. 8 or 9, illustrating the injector blade and a thimble assembly.

Likewise, the liner 40 includes at least one corresponding thimble aperture 146 through which the respective thimble assembly 160 of the AFS injection assembly 210 is positioned (shown most clearly in FIGS. 8, 9, and 11). The one or more injection assemblies 210 are disposed through the downstream portion 134 of the forward casing 130, the outer sleeve 60, and the liner 40 (specifically, the second cylindrical liner section 46).

The injection assemblies 210 inject a second fuel/air mixture into the combustion liner 40 in a direction transverse to the center line and/or the flow of combustion products from the primary combustion zone 90, thereby forming the secondary combustion zone 100. The combined hot gases 26 from the primary and secondary combustion zones 90, 100 travel downstream through the aft end 52 of the combustor can 24 and into the turbine section 28 (FIG. 1), where the combustion gases 26 are expanded to drive the turbine 28.

In the embodiment shown in FIGS. 2 through 4, the downstream casing portion 134 is a separate component that is configured for installation between the upstream casing portion 132 and the compressor discharge case 140. The downstream casing portion 134 includes a cylindrical portion 136 disposed centrally and extending axially between an upstream flange 137 and a downstream flange 138. The upstream flange 137 and the downstream flange 138 define mounting holes therethrough for joining to complementary flanges of the upstream casing portion 134 (i.e., flange 133) and the compressor discharge case 140 (i.e., flange 148 or flange 144), respectively. Such a configuration with a separate downstream casing portion 132 may be useful in retrofit installations in which an existing combustor can 24 is being upgraded to include the present axial fuel staging system 200, although this configuration may be used with new build combustor cans 24 as well.

As shown in FIG. 5, the forward casing 130 is a unified piece that has an upstream casing portion 132 that is adjacent to the head end portion 70 and a downstream casing portion 134 that is adjacent to the compressor discharge case 140. In this embodiment, the upstream flange 137 and the joining flange 133 may be omitted. Such a configuration may be useful for new build combustor cans 24, for example, to reduce part count and installation time.

The AFS injection assemblies 210 are installed through the cylindrical portion 136 of the downstream casing portion 134 with mounting accomplished via a mounting flange 242 of the injector unit 110 (shown in FIG. 8). Fuel for each AFS injection assembly 210 is supplied from a fuel supply line (not shown) external to the combustion can 24 and the forward casing 130, via a main fuel inlet 212 that is incorporated in one of the AFS injection assemblies 210. To facilitate discussion, the AFS injection assembly 210 having the main fuel inlet 212 is referred to herein as AFS injection assembly 210A.

Figure 6:
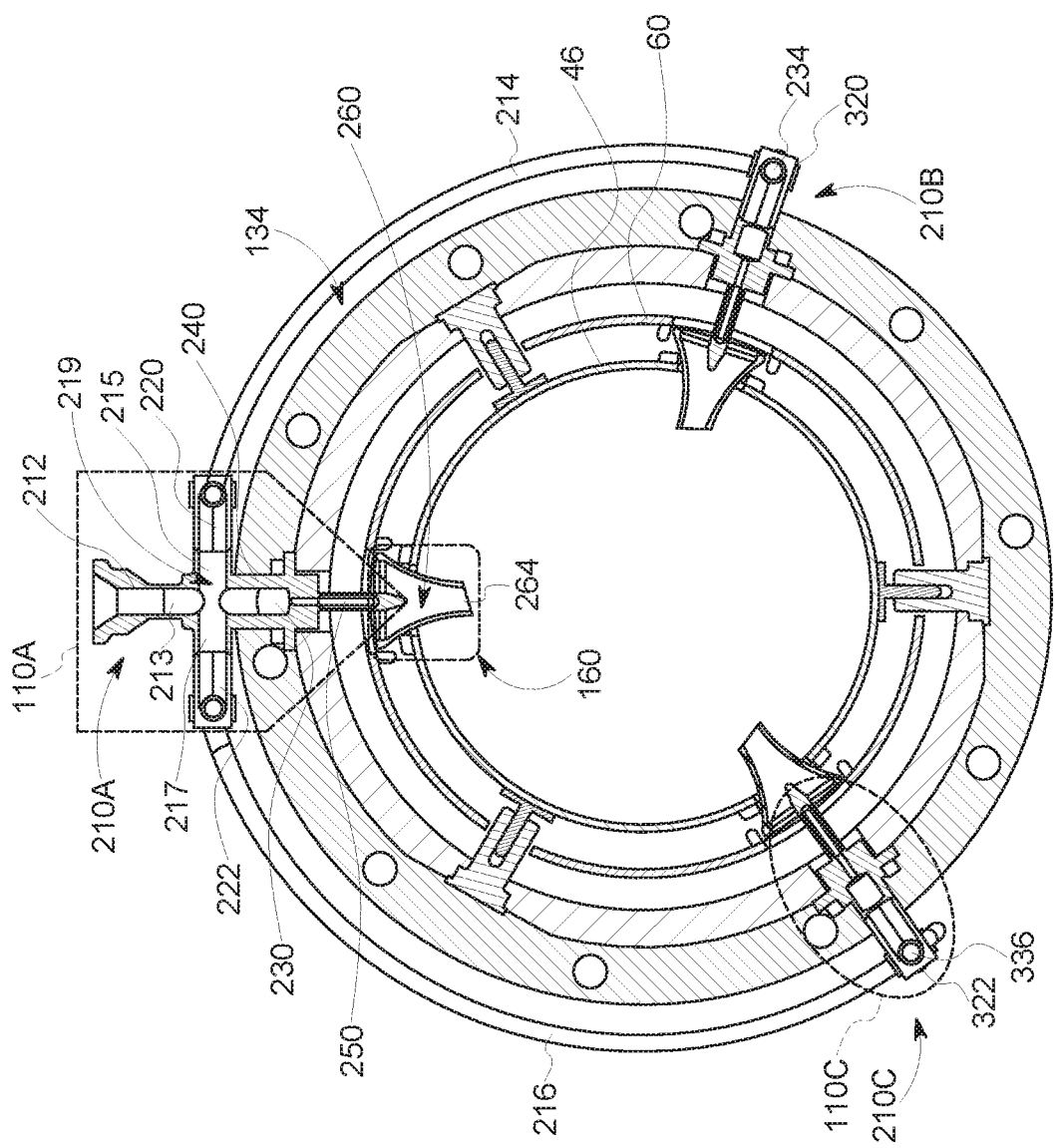
FIG. 6 is a cross-sectional view of the present fuel injection assemblies installed in a first exemplary configuration within the combustion can of FIG. 2, as taken from an aft end of the combustor can looking in a forward direction.

As shown more clearly in FIGS. 3 and 6, the main fuel inlet 212 is fluidly coupled to a first fuel supply line 214, which is coupled to a second AFS injection assembly 210B circumferentially disposed in a first direction from the first AFS injection assembly 210A having the main fuel inlet 212; and a second fuel supply line 216, which is coupled to a third AFS injection assembly 210C circumferentially disposed in a second, opposite direction from the first AFS injection assembly 210A having the main fuel inlet 212. The fuel supply lines 214, 216 may be rigid pipes (as shown), which are disposed radially outward of the upstream flange 137 and/or the forward casing 130.

Because the fuel supply line (not shown) supplying the main fuel inlet 212 and the fuel supply lines 214, 216 between injection assemblies 210A, 210B, and 210C are external to the combustion can 24 (that is, are radially outboard of the forward casing 130), inspection for leak detection or other damage is facilitated. Additionally, the possibility of fuel leakages within the high-pressure plenum 142 of the compressor discharge case 140 is significantly reduced. As a result, any fuel leakages that may occur are dissipated into the atmosphere, thereby removing the likelihood of ignition within the high-pressure plenum 142.

Moreover, because the ignition risk associated with unintended fuel leakage is minimized by the external fuel lines, the present AFS system 200 is well-suited for a wide range of fuels, including highly reactive fuels. By thermally isolating the fuel supply lines 214, 216 outside the forward casing 130, the variance in fuel heating (i.e., pressure ratio and Modified Wobbe Index) is reduced. Also, because the heat transferred to the fuel supply lines 214, 216 is reduced, the propensity of coking within the fuel supply lines 214, 216, when operating on liquid fuel, is diminished.

Figure 7:
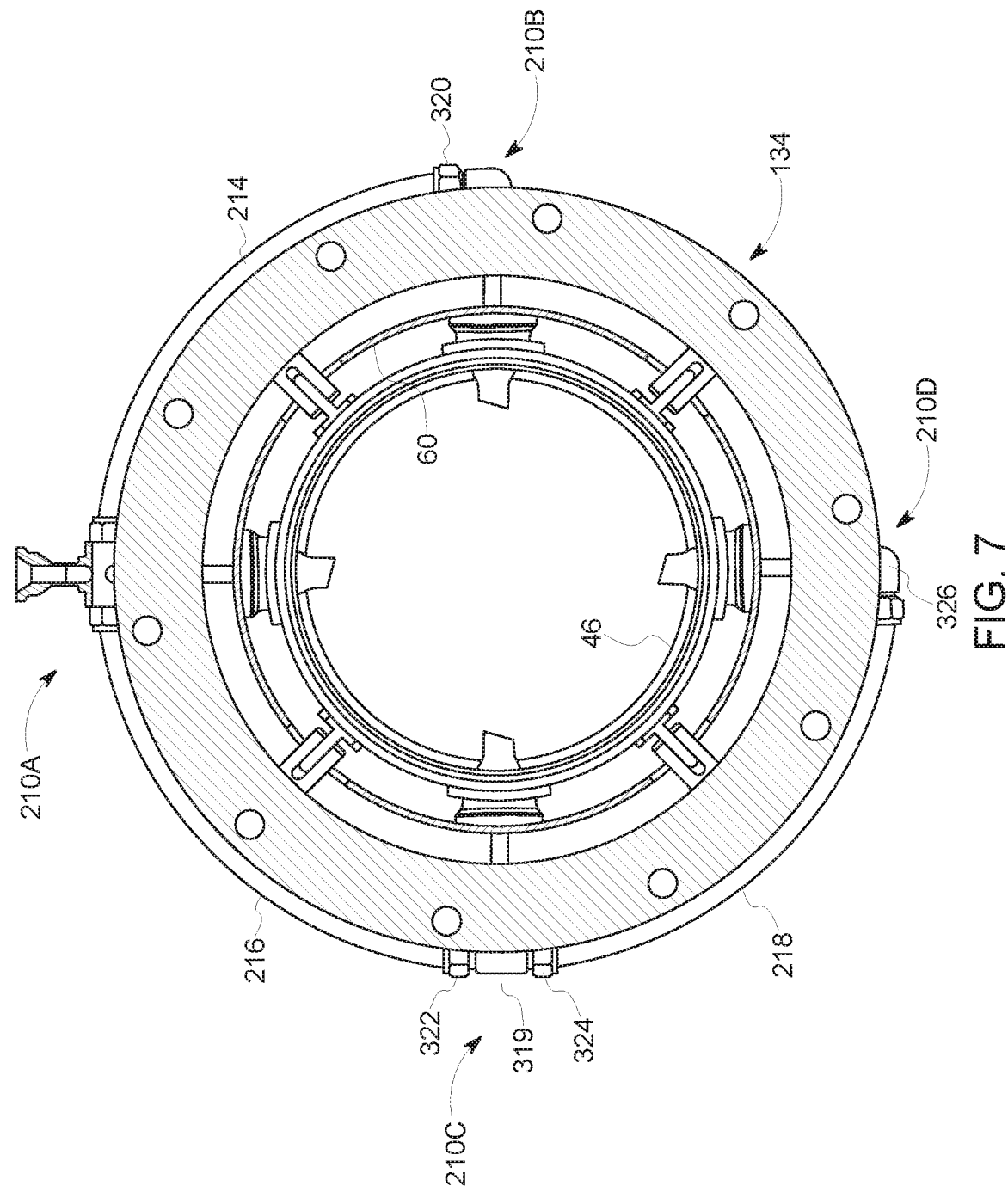
FIG. 7 is a cross-sectional view of the present fuel injectors installed in a second exemplary configuration within the combustion can of FIG. 2, as taken from an aft end of the combustor can looking in a forward direction.

Other methods of delivering fuel to the AFS injection assemblies 210 may be employed instead, including supplying fuel from a ring manifold or from individual fuel supply lines that extend from a source external to the forward casing 130 and/or the compressor discharge case 140. It should also be understood that more than three injection assemblies 210 may be used, including an exemplary embodiment having four injection assemblies 210 as shown in FIG. 7. By having the fuel connections radially outward of the combustion can 24, the need for fuel seals within the combustor enclosure is eliminated, thus improving reliability and facilitating inspection and maintenance.

The fuel injection assembly 210A, as shown in FIGS. 4 through 6 and 8, includes an injector unit 110A and a thimble assembly 160. The injector unit 110A includes the main fuel inlet 212 that directs fuel into a throat region 213. The throat region 213 is fluidly connected to an intermediate conduit 219 (shown in FIG. 6), which is oriented transverse to the throat region 213. The intermediate conduit 219 defines a pair of oppositely disposed fuel passages 215, 217 that are fluidly connected to L-shaped (90-degree) fuel line fittings 220, 222. The throat region 213 also delivers fuel to a fuel plenum 230 disposed within a body 240 of the fuel injection assembly 210. From the fuel plenum 230, fuel travels into an injector blade 250, which includes a number of fuel injection ports 252 (and, optionally, 254) that deliver the fuel into a thimble 260 where the fuel mixes with air.

As best seen in FIG. 3, one leg of each of the L-shaped fuel line fittings 220, 222 is disposed perpendicularly to the fuel passages 215, 217 and is oriented toward the forward end 70 of the combustor 22. A first end 224 of the fuel supply line 214 connects to the fuel line fitting 220. Similarly, a first end 226 of the fuel supply line 216 connects to the fuel line fitting 222.

Also shown in FIG. 3, the fuel supply lines 214, 216 have the shape of a square bracket or block C-shape. First ends 224, 226 of the fuel supply lines 214, 216 are generally orthogonal to a central portion of the fuel supply lines 214, 216, such that the central portions are axially offset from the injection assemblies 210. The fuel supply line 214 has a second end 234 that is orthogonal to the central portion and oriented in the same direction as the first end 224 (i.e., opening toward the aft end of the combustor), the second end 234 being connected to a single L-shaped fitting 320 of the fuel injection assembly 210B. Likewise, although not shown in the Figures, the fuel supply line 216 has a second end that is orthogonal to the central portion and oriented in the same direction as the first end 226 (i.e., opening toward the aft end of the combustor), the second end being connected to an L-shaped fitting 322 of the fuel injection assembly 210C (shown in FIG. 6).

The configuration of four fuel injection assemblies 210, as shown in FIG. 7, employs a second L-shaped fitting 324 opposite the first L-shaped fitting 322 of the fuel injection assembly 210C. The first fitting 322 and the second fitting 324 may be spaced apart from one another using an intermediate conduit 319, in a manner similar to that used for the fuel injection assembly 210A. A third fuel supply line 218 is connected at a first end to the second conduit 324 and at a second end to a fuel line fitting 326 of a fourth fuel injection assembly 210D. Although the injection assemblies 210A, 210B, 210C, and 210D are illustrated as being spaced evenly in the circumferential direction, such spacing is not required.

Moreover, in either the configuration shown in FIG. 6 with three fuel injection assemblies 210 or the configuration shown in FIG. 7 with four fuel injection assemblies, the fuel injection assemblies 210 may be oriented in the same axial plane (as shown) or in different axial planes (with accommodations being made, as needed, to the shape and/or dimensions of the fuel supply lines 214, 216, and/or 218 to achieve fluid connections between the fuel injection assemblies 210). It should be appreciated that any number of fuel injection assemblies 210 may be employed in the present axial fuel staging system 200, and the disclosure is not limited to the particular configurations illustrated herein.

As observed in FIGS. 6 and 7, each thimble 260 has an outlet 264 that is angled relative to an inlet of the thimble 260, as discussed in more detail with reference to FIGS. 12 and 13. The angled outlets 264 provide more predictability in the direction of flow produced by the fuel injection assemblies 210, and the angle of the outlet 264 of each thimble 260 is oriented in the same direction. As seen in the Figures, the thimble 260 projects radially inward of the liner 46, thus extending into the flow field of the combustion products originating from the primary combustion zone 90 for producing additional combustion products in the secondary combustion zone 100.

FIGS. 8 and 9 illustrate the fuel injection assemblies 210A and 210B, respectively. As shown in FIGS. 6 and 8, the injector unit 110A includes the main fuel inlet 212 that directs fuel into the throat region 213 of the injector unit 110A. The throat region 213 is fluidly connected to an intermediate conduit 219, which includes the oppositely disposed fuel passages 215, 217 that are connected to L-shaped fuel line fittings 220, 222. The throat region 213 also delivers fuel to the fuel plenum 230 disposed within the body 240 of the fuel injection assembly 210A. The fuel plenum 230 extends into the injector blade 250, which includes the fuel injection ports 252 that deliver the fuel into the thimble 260 where the fuel mixes with air.

As shown in FIG. 6, the first fuel supply line 214 is coupled to the fuel line fitting 220 and delivers fuel from the fuel passage 215 to a second fuel injection assembly 210B. As shown in FIG. 9, the fuel injection assembly 210B includes a fuel line fitting 320 that receives the first fuel supply line 214 (not shown). From the fuel line fitting 320, fuel flows through a throat region 313 and a body 340 of the injector unit 110B to the injector blade 250. The body 340 includes a mounting flange 342 to facilitate assembly to the downstream end 136 of the forward casing 130.

Figure 10:
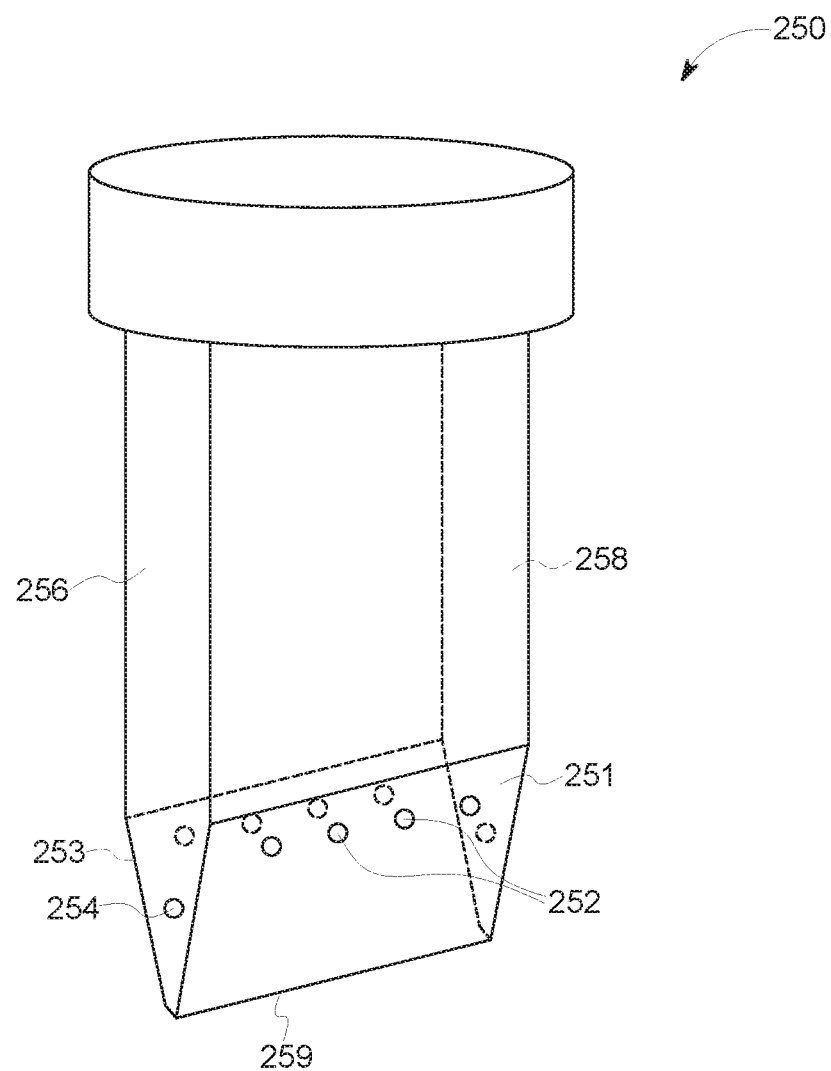
FIG. 10 is a schematic perspective view of an injector blade suitable of use with the fuel injection assemblies of FIGS. 8 and 9.

As illustrated in FIGS. 8 through 10, the injector blade 250 includes a number (e.g., four) of fuel injection ports 252 disposed on one or more surfaces 251, 253 thereof. An equivalent number (e.g., four) of fuel injection ports may be disposed on opposite surfaces 251, 253 of the injector blade 250. Other numbers of fuel injection ports 252 may be used on one or both surfaces, and the fuel injection ports 252 may be disposed in a single plane (as shown) or in two or more planes. The fuel ports 252 on a first surface 251 may be aligned with, or staggered (offset) from, the fuel ports 252 on a second surface 253.

Additionally, one or more fuel injection ports 254 may be defined through a first edge 256 and/or a second edge 258 of the injector blade 250. The first edge 256 may be considered a leading edge, relative to a flow of air 18 in the annulus 135, while the second edge 258 may be considered a trailing edge, relative to the flow of air 18 in the annulus 135. The fuel injection ports 252, 254 are disposed upstream, relative to air flow 18 through the thimble 260, of a terminal edge 259 of the injector blade 250.

The fuel injection ports 252, 254 may supply fuel from a single source or from multiple sources. The fuel injection ports 252, 254 may supply gaseous fuel or liquid fuel (including liquid fuel emulsified with water). For instance, both the fuel injection ports 252 and the fuel injection ports 254 may be coupled to a single fuel source. Alternately, the fuel injection ports 252 may be coupled to a gaseous fuel source, while the fuel injection ports 254 may be coupled to a liquid fuel source (including a source of liquid fuel emulsified, or mixed, with water). Where separate fuel sources are used, the conduit (not shown) feeding the main fuel inlet 212 may be a concentric tube-in-tube conduit, and the fuel supply lines 214, 216 may be tube-in-tube conduits. Separate fuel plenums may be provided for each fuel source and/or type. Alternately, separate fuel lines for the liquid fuel and the gaseous fuel may be employed, some or all of which are external to the forward casing 130.

In yet another variation (not illustrated separately), liquid fuel may be introduced through the body of the thimble 260, via an internal fuel conduit or a liquid fuel conduit introduced radially through the injector port 290 in the forward casing 130 or an internal fuel conduit, as described in commonly assigned U.S. patent application Ser. No. 15/593,543, entitled "Dual Fuel Injectors and Methods of Use in Gas Turbine Combustor."

Figure 12:
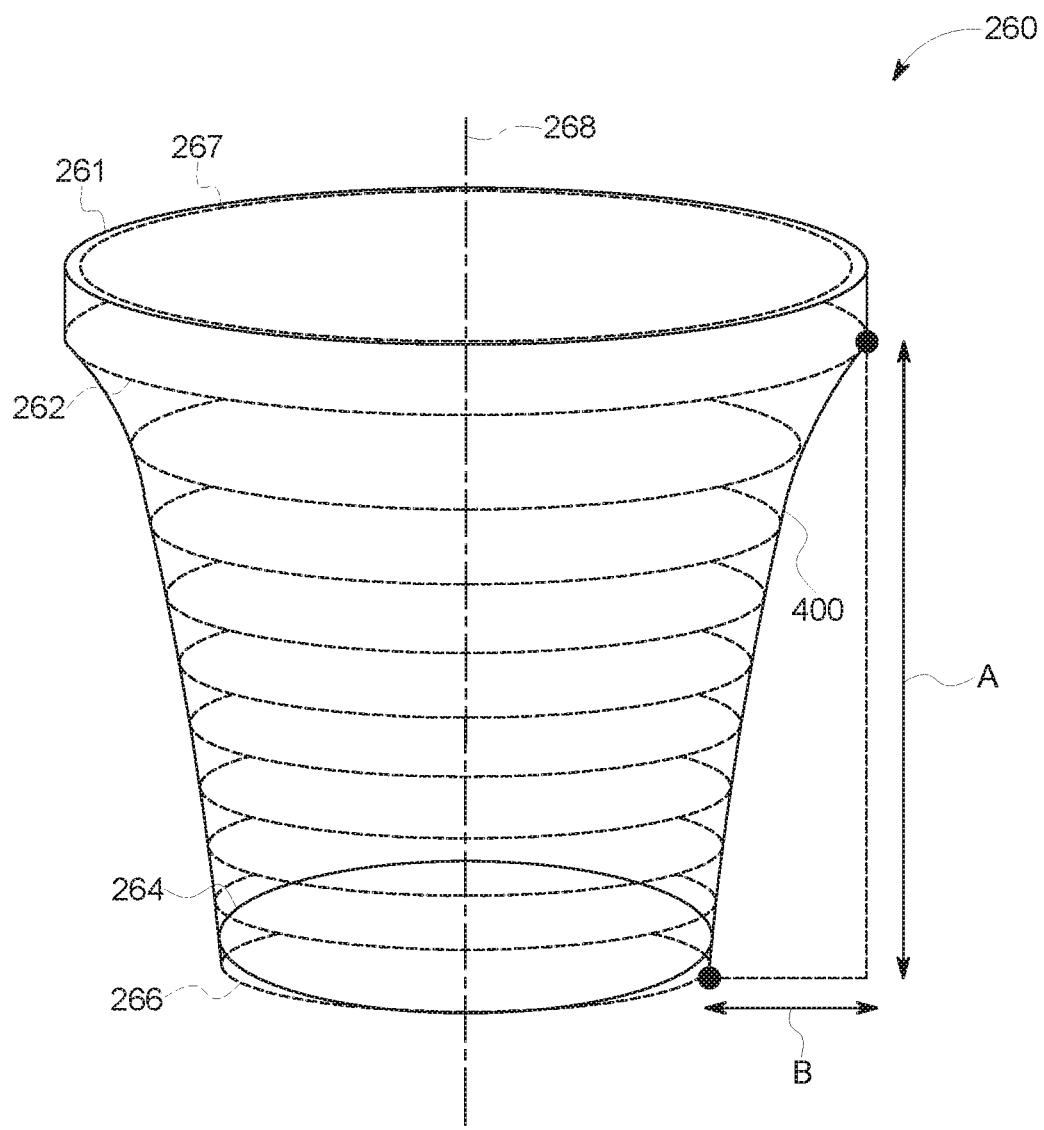
FIG. 12 is a schematic depiction of a front view of an interior surface of a thimble of one of the thimble assemblies, as shown in FIGS. 8, 9, and 11, when viewed in an axial direction.
Figure 13:
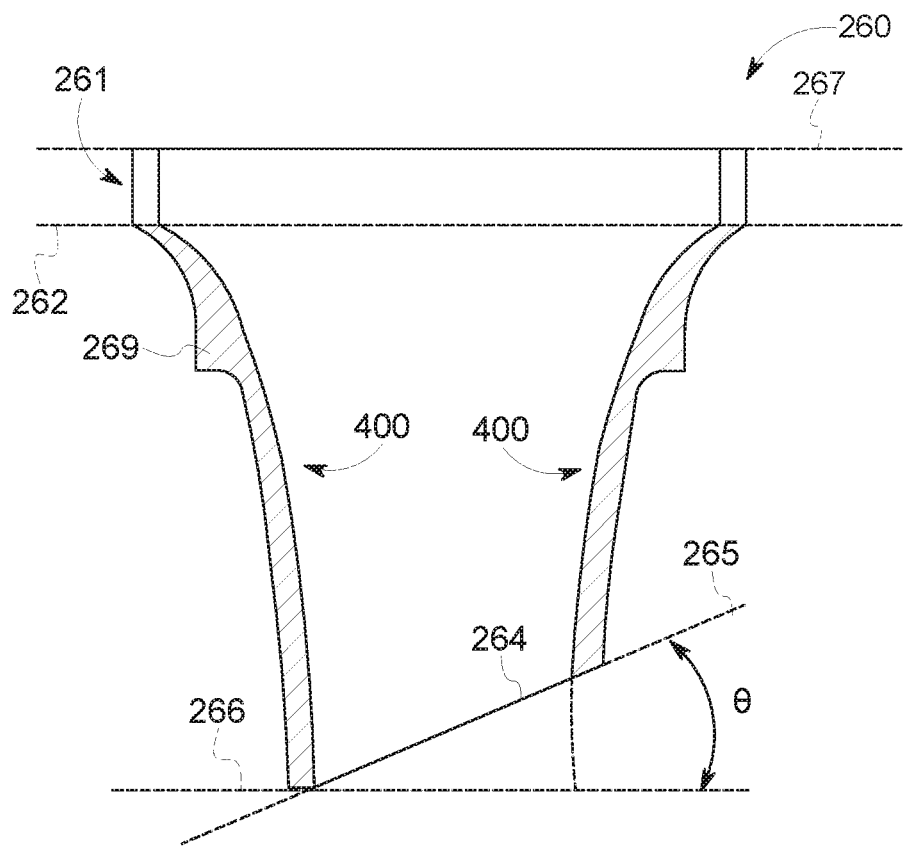
FIG. 13 is a schematic depiction of a side view of the thimble of FIG. 12, as viewed in a transverse direction.

FIGS. 11 through 13 illustrate the thimble assembly 160 that includes the thimble 260, which provides a mixing chamber for air and fuel delivered by the injector blade 250. The thimble 260 has a generally tapering shape from its inlet to its outlet (discussed in more detail below). The thimble 260 may be machined, cast, or manufactured by three-dimensional printing (sometimes referred to as "additive manufacturing").

An inlet 261 of the thimble 260 is disposed radially inward from the injector opening 62 in the outer sleeve 60, and the outlet opening 264 of the thimble 260 is disposed radially inward from the liner 46. An air shield 64 having an arcuate shape is mounted to the radially inner surface of the outer sleeve 60 to direct air flow 18 around the thimble 260, thereby minimizing the flow disturbance otherwise created by the thimble 260 in the annulus 65.

Figure 14:
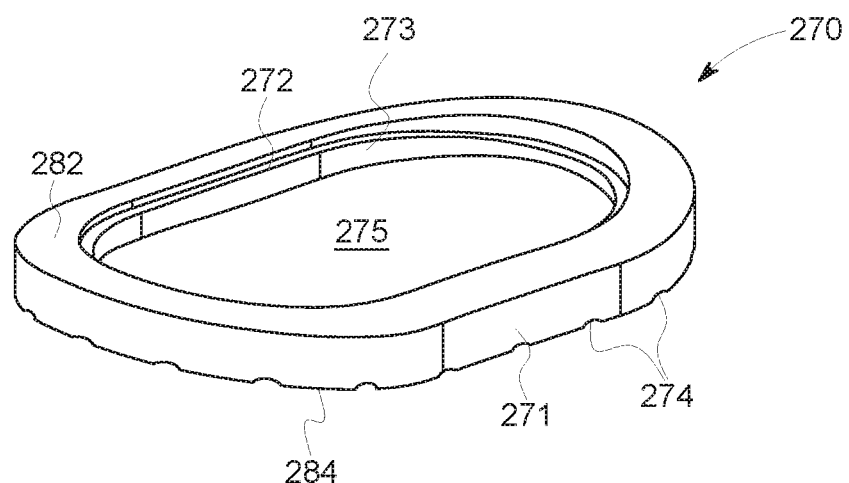
FIG. 14 is a perspective view of a thimble boss, which may be used with thimble assembly of FIG. 11, as viewed from a top surface thereof.
Figure 15:
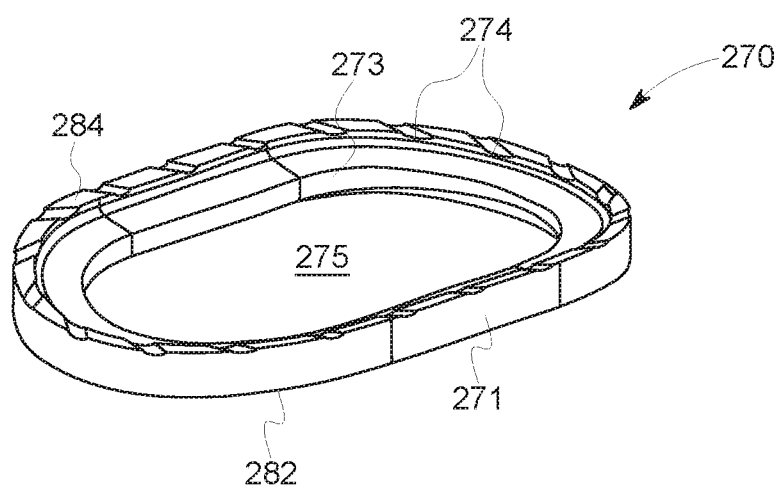
FIG. 15 is a perspective view of the thimble boss of FIG. 14, as viewed from a bottom surface thereof.

The thimble 260 is supported in a position extending through the thimble aperture 146 in the liner 46 by a thimble boss 270 (shown separately in FIGS. 14 and 15). As shown in FIG. 14, for example, the thimble boss 270 has an elliptical (oval) shape defined by an outer perimeter 271, a top surface 282 (proximate to the outer sleeve 60), and a bottom surface 284 (in contact with the outer surface of the liner 46). A passage, or aperture, 275 is defined through the thimble boss 270 by an inner perimeter 273. The inner perimeter 273 is slightly larger than the corresponding cross-sectional diameter of the thimble 260.

Referring again to FIG. 11, the outer surface of the thimble 260 includes an outwardly projecting rib 269 that extends around at least a portion of the perimeter of the thimble 260 and that engages a corresponding shelf 272 along the inner perimeter 273 of the thimble boss 270. The thimble boss 270 is mounted to the liner 46, such that the bottom surface 284 is proximate to and contacts an outer surface of the liner 46.

As mentioned above, the thimble 260 projects radially inward of the liner 46, thus extending into the flow field of the combustion products originating from the primary combustion zone 90. Such a configuration facilitates mixing of the secondary fuel/air mixture with the combustion products from the primary combustion zone 90, as well as propelling the flow of combustion products in the secondary combustion zone 100 away from the liner 46.

The thimble 260 is cooled by air 18 flowing through the annulus 65 between the liner 46 and the outer sleeve 60, which seeps through air flow passages 274 formed on the liner-adjacent bottom surface 274 of the thimble boss 270. From the air flow passages 274, air 18 flows through the thimble aperture 146 in the liner 46 and along the outer surface of the thimble 260. The mounting of the thimble boss 270 is accomplished without blocking the air flow passages 274 (e.g., by spot welding).

Air 18 flows in an upstream direction (relative to the flow of combustion products) through the annulus 65 between the liner 46 and the outer sleeve 60. As shown in FIG. 2, at the head end 70, the air flow 18 splits, and a first portion of the air 18 is directed to the fuel nozzles 80, 82 in the head end 70, and a second portion of the air 18 is directed to the annulus 135 between the outer sleeve 60 and the forward casing 130. Air flowing through the annulus 135 flows through the opening 62 in the outer sleeve 60 and into the thimble 260, where the air 18 mixes with fuel from the injector blade 250 to form a second fuel/air mixture that is discharged from the thimble outlet 264 and into the secondary combustion zone 100.

The injector blade 250 defines an axial length L1 ("axial" relative to a longitudinal axis of the combustor 24), and the thimble 260 defines an axial length L2 greater than the axial length L1. These dimensions facilitate the flow of air around the injector blade 250 and the mixing of air and fuel from the injector blade 250 within the thimble 260. As illustrated, the injector blade 250 and the thimble 260 are centered along a common injection axis 268 (as shown in FIGS. 8 and 9), when the injection assembly 210 is operational. When the injection assembly 210 is hot, the thermal expansion of the components causes the injector blade 250 and the thimble 260 to become aligned along the injection axis 268. However, during installation, when the hardware is cold, the injector unit 110 (including the blade 250) and the thimble 260 have longitudinal axes that are offset from one another and/or the injection axis 268.

FIG. 12 illustrates an interior surface profile of the thimble 260, as described above. The interior surface profile of the thimble 260 has a specific shape to achieve the velocity desired for the flow of fuel and air to penetrate sufficiently into the combustion zone 100. Specifically, the flow of fuel and air near the interior surfaces of the thimble 260 is accelerated to velocities higher than the turbulent flame speed. The elliptical shape also causes the flow to remain attached to the interior surfaces of the thimble 260, thus minimizing flame holding and flashback.

The inlet portion 261 of the thimble 260 defines an elliptical (oval) shape about the injection axis 268, which is oriented perpendicularly to the axis 268 and which extends axially along axis 268 from an inlet plane 267 to an intermediate plane 262. The shape and size of the thimble 260 is the same at the inlet plane 267 and the intermediate plane 262, such that a uniform cross-section is defined by the thimble wall between the inlet plane 267 and the intermediate plane 262. The elliptical shapes of the thimble 260 at the inlet plane 267 and the intermediate plane 262 each include an array of points defining the elliptical shape.

The thimble 260 includes the outlet opening 264 opposite the inlet portion 261, the outlet opening 264 located in an outlet plane 265 (FIG. 13). A terminal plane 266, which defines an elliptical shape, is parallel to the intermediate plane 262 and includes an array of points, including a point most distant from a corresponding point defining the elliptical shape of the intermediate plane 262. This most distant point is also found in the array of points defining the outlet opening 264. The outlet opening 264 is disposed in an outlet plane 265 at an oblique angle "theta" ($\theta$) relative to the terminal plane 266, as shown in FIG. 13, to create a more predictable flow direction of the fuel and air being injected into the secondary combustion zone 100.

Each cross-section of the thimble 260 taken in a respective plane perpendicular to the injection axis 268 (i.e., the direction of flow through the thimble 260) is also elliptical. The individual ellipses each have a center that coincides with the injection axis 268. The individual planar ellipses are fitted to a continuous arc 400 defining one quadrant of an imaginary ellipse having a semi-major axis of length "A" and a semi-minor axis of length "B", in which the length A defines the height of the thimble 260 and the length B defines the geometry of taper between the intermediate plane 262 and the outlet plane 266 of the thimble 260. The term "semi-major" refers to one-half the major axis, and the term "semi-minor" refers to one-half the minor axis, in both cases running from the center through a focus and to the perimeter of the imaginary ellipse.

It has been found that the ratios of A to B in the range from 1.5:1 to 30:1 (including 1.5:1 and 30:1) are well-suited for achieving the desired performance. In another aspect, the ratio of A to B may be in the range from 1.5:1 to 5:1 or, in yet another aspect, from 3:1 to 5:1. In still another aspect, the ratio of A to B may be greater than 3:1 and less than 30:1. The arc 400 may have a first end point in any point in an array of points defining the imaginary ellipse disposed in the intermediate plane 262 and a second end point in any corresponding point in the array of points defining the imaginary ellipse of the terminal plane 266. In one embodiment, each point of the imaginary ellipse disposed in the intermediate plane 262 is a first end point of the arc 400, which is connected to a corresponding second end point on the terminal plane 266.

Mathematically, the formula that defines the arc 400 as one quadrant of an imaginary ellipse, whose major axis A is parallel to the injection axis 268, may be represented as follows:

$$x^2 + \frac{y^2}{M^2} = 1,$$

where x is a non-zero number (i.e., x≠0), y is greater than zero (i.e., y>0), and M is a number between 1.5 and 30 and including 1.5 and 30 (i.e., 1.5≤M≤30).

Cross-sectional ellipses defined along the arc 400 and oriented perpendicularly to the injection axis 268 decrease in effective area from the intermediate plane 262 to the terminal plane 266.

FIG. 13 illustrates a side view of the thimble 260. As discussed above, the outlet opening 264 is disposed along an outlet plane 265 that is oblique (non-parallel) to the terminal plane 266, such that an angle "theta" (θ) is defined between the outlet plane 265 and the terminal plane 266. The terminal plane 266 and the intermediate plane 262, as well as the plane defining the inlet 261, are parallel to one another.

Figure 16:
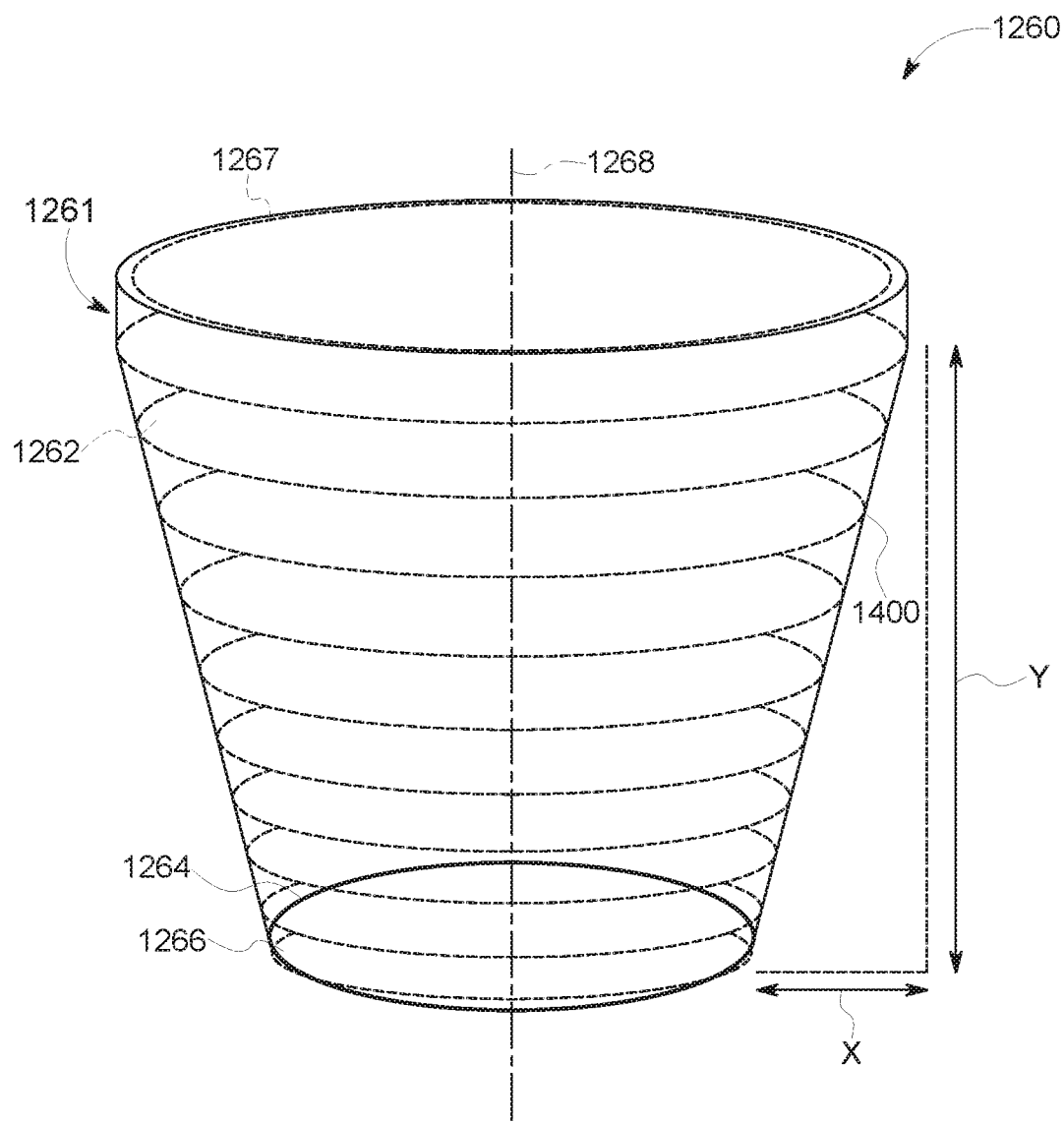
FIG. 16 is a schematic depiction of a front view of an interior surface of an alternate thimble as may be used with one of the thimble assemblies of FIGS. 8, 9, and 11, the thimble being viewed in an axial direction.

FIG. 16 illustrates an interior surface profile of an alternate thimble 1260. The inlet portion 1261 of the thimble 1260 defines an elliptical (oval) shape about the injection axis 1268, which is oriented perpendicularly to the axis 1268 and which extends axially along axis 1268 from an inlet plane 1267 to an intermediate plane 1262. The shape and size of the thimble 1260 is the same at the inlet plane 1267 and the intermediate plane 1262, such that a uniform cross-section is defined by the thimble wall between the inlet plane 1267 and the intermediate plane 1262. The elliptical shapes of the thimble 1260 at the inlet plane 1267 and the intermediate plane 1262 each include an array of points defining the respective elliptical shape.

The thimble 1260 includes the outlet opening 1264 opposite the inlet 1261, the outlet opening 1264 located in an outlet plane (as shown in FIG. 13). A terminal plane 1266, which defines an elliptical shape, is parallel to the intermediate plane 1262 and includes an array of points, including a point most distant from a corresponding point defining the elliptical shape of the intermediate plane 1262. This most distant point is also found in the array of points defining the outlet opening 1264. The outlet opening 1264 is disposed in an outlet plane 1265 at an oblique angle "theta" (θ) relative to the terminal plane 1266, as shown in FIG. 13.

Each cross-section of the thimble 1260 taken in a respective plane perpendicular to the injection axis 1268 (i.e., the direction of flow through the thimble 1260) is also elliptical. The individual ellipses each have a center that coincides with the injection axis 1268. The length "y" defines the height of the thimble 1260, and the length "x" defines the geometry of taper between the intermediate plane 1262 and the outlet plane 1266 of the thimble 1260.

The individual planar ellipses are fitted to a line segment 1400 extending between any point in the intermediate plane 1262 and any corresponding point in the terminal plane 1266, where the line segment is a portion of a line defined by the equation:

$$y = Mx,$$

where M is a number between 1.5 and 30, including the endpoints (i.e., $1.5 \leq M \leq 30$). In one aspect, M is a number between 1.5 and 5, or between 3 and 5, or greater than 3 and less than 30.

With reference to FIGS. 2 and 5 once again, assembly of the combustion can 24 having an axial fuel staging system 200 is accomplished from the outside working inwardly. The forward casing 130 (or the downstream casing portion 134) is attached, via the downstream flange 138, to a flange 144 of the compressor discharge case 140 (or an intermediate flange 148 connected to the CDC flange 144, as shown in FIG. 2). The liner 40 is installed from the forward end of the combustion can 24 toward the compressor discharge case 140. The thimble bosses 270 are pre-mounted to the outer surface of the liner 40 defining the perimeter of thimble openings 146 through the liner 40. Once the liner 40 is positioned, the thimbles 260 are inserted into the thimble openings 146 and engage the thimble bosses 270. The outer sleeve 60 is installed from the aft end of the combustion can 24 toward the head end 70 into the space between the liner 40 and the forward casing 130. The air shields 64 are pre-installed on an inner surface of the outer sleeve 60 proximate the injector openings 62 defined through the outer sleeve 60. The injector openings 62 and the thimble openings 146 are aligned axially and circumferentially. The transition piece 50 is installed over the third cylindrical portion 48 of the liner 40 and its hula seal 49.

The injector units 110 are mounted to the forward casing 130, such that the injector blades 250 extend into the thimbles 260. During installation, the injector units 110 have longitudinal axes that are offset from the longitudinal axes of the corresponding thimbles 260. However, during engine operation, when the components are hot, the longitudinal axes of the injector units 110 and the thimbles 260 align with one another along the respective injection axis 268 of each injection assembly 210. After the injector units 110 are secured to the forward casing 130, the fuel supply lines 214, 216 are connected, and a main fuel supply line (not shown) is connected to the main fuel inlet 212 of the fuel injection assembly 210A.

The present fuel injection assemblies described herein facilitate enhanced mixing of fuel and compressed gas in a combustor with axially staged combustion to reduce emissions. The present fuel injection systems and AFS systems therefore facilitate improving the overall operating efficiency of a combustor such as, for example, a combustor in a gas turbine assembly. This increases the output and reduces the cost associated with operating a combustor, such as a combustor used in a heavy-duty, land-based, power-generating gas turbine assembly.

Moreover, when the combustor is turned-down and the injector units are unfueled, the thimble assemblies direct air flow into the downstream portion of the combustor liner, thus promoting complete combustion of the combustion products from the primary combustion zone. It has been found that the spacing of the thimble assemblies and their angled outlets prevent the formation of cold streaks that might otherwise be caused by the introduction of cooling air into the hot combustion products. Thus, the impact of the cooler air introduced by the thimble assemblies on the exit temperature profile of the combustion can is minimized. It has been found that the exit temperature profile remains consistent, whether or not the injector units are fueled, thereby improving the durability of the turbine and its components.

Exemplary embodiments of fuel injectors and methods of using the same are described above in detail. The methods and systems described herein are not limited to the specific embodiments described herein, but rather, components of the methods and systems may be utilized independently and separately from other components described herein. For example, the methods and systems described herein may have other applications not limited to practice with turbine assemblies, as described herein. Rather, the methods and systems described herein can be implemented and utilized in connection with various other industries.

While the technical advancements have been described in terms of various specific embodiments, those skilled in the art will recognize that the technical advancements can be practiced with modification within the spirit and scope of the claims.

What is claimed is:

1. A combustor comprising:
a head end comprising a primary fuel nozzle;
a liner coupled to the head end, the liner defining a primary combustion zone proximate the head end and a secondary combustion zone downstream of the primary combustion zone;
a forward casing radially outward of and surrounding at least a portion of the liner;
an outer sleeve disposed radially between the liner and the forward casing, the outer sleeve circumscribing at least a portion of the liner such that a first annulus is defined between the liner and the outer sleeve and a second annulus is defined between the outer sleeve and the forward casing;
an axial fuel staging system including a first fuel injection assembly, the first fuel injection assembly comprising:
a first thimble assembly mounted to the liner and including a first thimble extending through a first thimble aperture in the liner, such that an outlet portion of the first thimble is disposed in the secondary combustion zone inboard of the liner, the first thimble having an inlet portion in fluid communication with the second annulus; and
a first injector unit attached to the forward casing and extending radially through an injector port in the forward casing, such that a portion of the first injector unit is disposed within the first thimble and a main fuel inlet of the first injector unit is disposed radially outward of the forward casing, wherein the first injector unit, the injector port, the first thimble, and the first thimble aperture are disposed along an injection axis extending inwardly toward the secondary combustion zone;
wherein the first annulus between the liner and the outer sleeve conveys a first flow of air in a first direction toward the head end, and the second annulus between the outer sleeve and the forward casing conveys a second flow of air in a second, opposite direction away from the head end to the first thimble, the second flow of air from the second annulus being directed into the first thimble; and
wherein the first fuel injection assembly introduces a flow of fuel into the second flow of air flowing through the first thimble, such that fuel and air are injected into the secondary combustion zone in a direction transverse to a flow of combustion products from the primary combustion zone.

2. The combustor of claim 1, wherein the axial fuel staging system comprises a plurality of axial fuel injection assemblies, each axial fuel injection assembly comprising:
a respective thimble assembly mounted to the liner;
a respective thimble extending through a respective thimble aperture in the liner, such that an inlet portion of the respective thimble is in fluid communication with the second annulus and an outlet portion of the respective thimble extends into the secondary combustion zone; and
a respective injector unit attached to the forward casing and extending radially through a respective injector port in the forward casing, such that a portion of each respective injector unit is disposed within the corresponding respective thimble and a respective fuel line fitting of the respective injector unit is disposed radially outward of the forward casing.

3. The combustor of claim 1, wherein the axial fuel staging system includes a second fuel injection assembly disposed in a first circumferential direction from the first fuel injection assembly and a third fuel injection assembly disposed in a second, opposite circumferential direction from the first fuel injection assembly; and
wherein a first fuel supply line fluidly connects the first fuel injection assembly to the second fuel injection assembly, and a second fuel supply line fluidly connects the first fuel injection assembly to the third fuel injection assembly, the first fuel supply line and the second fuel supply line being disposed radially outward of the forward casing.

4. The combustor of claim 3, wherein the axial fuel staging system includes a fourth fuel injection assembly disposed in the second circumferential direction from the third fuel injection assembly; and
wherein a third fuel supply line fluidly connects the third fuel injection assembly to the fourth fuel injection assembly, the third fuel supply line being disposed radially outward of the forward casing.

5. The combustor of claim 3, wherein the first fuel injection assembly comprises a first fuel line fitting to which the first fuel supply line is secured and a second fuel line fitting to which the second fuel supply line is secured.

6. The combustor of claim 1, further wherein the outer sleeve defines an injector opening aligned with the first thimble aperture in the liner and through which the first injector unit projects and through which the second flow of air is directed into the first thimble.

7. The combustor of claim 1, wherein during installation, when the first injector unit and the first thimble are cold, the first injector unit and the first thimble have longitudinal axes that are offset from one another, wherein during engine operation, when the first injector unit and the first thimble are hot, the longitudinal axes of the of the first injector unit and the first thimble align with one another.

8. The combustor of claim 1, wherein, along the injection axis, the first injector unit is elongated in an axial direction along a central axis of the combustor, wherein, along the injection axis, the first thimble is elongated in the axial direction along the central axis of the combustor.

9. The combustor of claim 8, further comprising a transition piece disposed axially downstream of the liner and sealingly connected to the liner; and a compressor discharge case (CDC) circumferentially surrounding the transition piece and an aft end of the liner, the compressor discharge case comprising a CDC flange;
wherein a downstream portion of the forward casing comprises a first flange, the first flange being positioned adjacent to and being coupled to the CDC flange;
wherein the forward casing comprises an upstream casing portion and a downstream casing portion separate from the upstream casing portion, the downstream casing portion including the first flange and a second flange spaced axially apart from the first flange; and
wherein the first injector unit is mounted to the downstream casing portion between the first flange and the second flange.

10. The combustor of claim 9, wherein the upstream casing portion comprises a third flange, the third flange being coupled to the second flange of the downstream casing portion.

11. The combustor of claim 1, wherein the first flow of air through the first annulus splits into the second flow of air through the second annulus and a third flow of air through the head end.

12. A combustor comprising:
a head end comprising a primary fuel nozzle;
a liner coupled to the head end, the liner defining a primary combustion zone proximate the head end and a secondary combustion zone downstream of the primary combustion zone;
a forward casing radially outward of and surrounding at least a portion of the liner;
an outer sleeve disposed radially between the liner and the forward casing, the outer sleeve circumscribing at least a portion of the liner and defining a first annulus between the liner and the outer sleeve and a second annulus between the outer sleeve and the forward casing;
an axial fuel staging system including a plurality of fuel injection assemblies, the plurality of fuel injection assemblies including a first fuel injection assembly and a second fuel injection assembly, each fuel injection assembly of the plurality of fuel injection assemblies comprising:
a thimble assembly mounted to the liner and including a thimble extending through a thimble aperture in the liner, such that a portion of the thimble has an inlet portion in fluid communication with the second annulus and an outlet portion disposed in the secondary combustion zone inboard of the liner; and
an injector unit attached to the forward casing and extending radially through an injector port in the forward casing, such that a portion of the injector unit is disposed within the thimble and a fuel line fitting of the injector unit is disposed radially outward of the forward casing, wherein the injector unit, the injector port, the thimble, and the thimble aperture are disposed along an injection axis extending inwardly toward the secondary combustion zone;
wherein the first annulus between the liner and the outer sleeve conveys a first flow of air in a first direction toward the head end, and the second annulus between the outer sleeve and the forward casing conveys a second flow of air in a second, opposite direction away from the head end to the thimble, the second flow of air from the second annulus being directed into the thimble; and
wherein the injector unit introduces a flow of fuel into the second flow of air flowing through the thimble, such that fuel and air are injected into the secondary combustion zone in a direction transverse to a flow of combustion products from the primary combustion zone.

13. The combustor of claim 12, wherein the second fuel injection assembly is disposed in a first circumferential direction from the first fuel injection assembly; wherein the plurality of fuel injection assemblies further includes a third fuel injection assembly disposed in a second, opposite circumferential direction from the first fuel injection assembly; and wherein a first injector unit of the first fuel injection assembly comprises a main fuel inlet for the axial fuel staging system, the main fuel inlet being radially outward of the forward casing.

14. The combustor of claim 13, further comprising a first fuel supply line fluidly connecting the first fuel injector unit of the first fuel injection assembly to a second fuel injector unit of the second fuel injection assembly; and a second fuel supply line connecting the first fuel injector unit of the first fuel injection assembly to a third fuel injector unit of the third fuel injection assembly.

15. The combustor of claim 14, wherein the second fuel injection assembly comprises a second fuel line fitting to which the first fuel supply line is secured; and wherein the third fuel injection assembly comprises a third fuel line fitting to which the second fuel supply line is secured.

16. The combustor of claim 12, wherein the outer sleeve defines a plurality of injector openings aligned with respective thimble apertures in the liner, each fuel injection assembly of the plurality of fuel injection assemblies projecting through a respective one of the plurality of injector openings and through which the second flow of air is directed into the respective thimbles.

17. The combustor of claim 12, wherein the outlet portion of the thimble has an angled outlet facing in a circumferential direction about an axis of the combustor.

18. The combustor of claim 12, wherein an interior surface profile of the thimble has an elliptical shape that decreases in size along the injection axis over at least half a length of the thimble between an inlet of the inlet portion and an outlet of the outlet portion of the thimble.

19. The combustor of claim 12, further comprising a transition piece disposed axially downstream of the liner and sealingly connected to the liner; and a compressor discharge case (CDC) circumferentially surrounding the transition piece and an aft end of the liner, the compressor discharge case comprising a CDC flange;
wherein a downstream portion of the forward casing comprises a first flange, the first flange being positioned adjacent to and being coupled to the CDC flange;
wherein the forward casing comprises an upstream casing portion and a downstream casing portion separate from the upstream casing portion, the downstream casing portion including the first flange and a second flange spaced axially apart from the first flange; and
wherein the first injector unit is mounted to the downstream casing portion between the first flange and the second flange.

20. The combustor of claim 19, wherein the upstream casing portion comprises a third flange, the third flange being coupled to the second flange of the downstream casing portion.

21. The combustor of claim 12, wherein the first flow of air through the first annulus splits into the second flow of air through the second annulus and a third flow of air through the head end.

* * * * *